May 21, 1957

G. R. STIBITZ 2,792,987

DECIMAL-BINARY TRANSLATOR

Filed July 28, 1949

BY
Carlson, Pitzner, Hubbard & Wolfe
ATTORNEYS

INVENTOR.
George R. Stibitz
BY
Carlson, Pitzner, Hubbard & Wolfe
ATTORNEYS

May 21, 1957

G. R. STIBITZ 2,792,987

DECIMAL-BINARY TRANSLATOR

Filed July 28, 1949

INVENTOR.
George R. Stibitz
BY
Carlson, Pitzner, Hubbard & Wolfe
ATTORNEYS

May 21, 1957  G. R. STIBITZ  2,792,987
DECIMAL-BINARY TRANSLATOR
Filed July 28, 1949  12 Sheets-Sheet 4

INVENTOR.
George R. Stibitz
BY
Carlson, Pitzner, Hubbard & Wolfe
ATTORNEYS

May 21, 1957  G. R. STIBITZ  2,792,987
DECIMAL-BINARY TRANSLATOR
Filed July 28, 1949  12 Sheets-Sheet 5

INVENTOR.
George R. Stibitz
BY
Carlson, Pitzner, Hubbard & Wolfe
ATTORNEYS

May 21, 1957

G. R. STIBITZ 2,792,987

DECIMAL-BINARY TRANSLATOR

Filed July 28, 1949

INVENTOR.
George R. Stibitz
BY
Carlson, Pitzner, Hubbard & Wolfe
ATTORNEYS

May 21, 1957           G. R. STIBITZ           2,792,987

DECIMAL-BINARY TRANSLATOR

Filed July 28, 1949                                           12 Sheets-Sheet 7

*Fig. 13.*

INVENTOR.
George R. Stibitz
BY
Carlson, Pitzner, Hubbard & Wolfe
ATTORNEYS

May 21, 1957 G. R. STIBITZ 2,792,987
DECIMAL-BINARY TRANSLATOR
Filed July 28, 1949 12 Sheets-Sheet 8

INVENTOR.
George R. Stibitz
BY
Carlson, Pitzner, Hubbard & Wolfe
ATTORNEYS

May 21, 1957      G. R. STIBITZ      2,792,987

DECIMAL-BINARY TRANSLATOR

Filed July 28, 1949      12 Sheets-Sheet 9

Fig. 13b.

TAPE 22

INVENTOR.

George R. Stibitz

BY

Carlson, Pitzner, Hubbard & Wolfe

ATTORNEYS

May 21, 1957  G. R. STIBITZ  2,792,987
DECIMAL-BINARY TRANSLATOR
Filed July 28, 1949  12 Sheets-Sheet 10

INVENTOR.
George R. Stibitz
BY
Carlson, Pitzner, Hubbard & Wolf
ATTORNEYS

May 21, 1957  G. R. STIBITZ  2,792,987
DECIMAL-BINARY TRANSLATOR
Filed July 28, 1949  12 Sheets-Sheet 11

INVENTOR.
George R. Stibitz
BY
Carlson, Pitzner, Hubbard & Wolfe
ATTORNEYS

May 21, 1957  G. R. STIBITZ  2,792,987
DECIMAL-BINARY TRANSLATOR
Filed July 28, 1949  12 Sheets-Sheet 12

INVENTOR.
George R. Stibitz
BY
Carlson, Pitzner, Hubbard & Wolfe
ATTORNEYS

United States Patent Office 2,792,987
Patented May 21, 1957

2,792,987

DECIMAL-BINARY TRANSLATOR

George R. Stibitz, Burlington, Vt.

Application July 28, 1949, Serial No. 107,283

26 Claims. (Cl. 235—61)

The present invention relates to a translating device for a computer and more particularly to means for converting data between decimal and binary systems of numbers.

It is an object of the present device to provide a translator for enabling data to be entered in the decimal system on a simple manual keyboard and for converting such data into a form in which it may be acted upon by sequential binary computing circuits. A more specific object is to provide improved means for converting the digits of a decimally expressed number into binary code groups each having a value equal to the decimal digit and then to operate upon such code groups to obtain a binary number in the form required for computation.

It is another object of the invention to provide a novel arrangement for translating a number from decimal to binary form in which the same type of circuits used in the later solution of a problem are employed for translation. It is still another object to utilize the computing circuits to return the data comprising the answer from binary form into a form in which it can be used in a decimal printer.

It is a further object to provide a device for converting a decimal number into a corresponding binary number, the data being entered on a keyboard and stored temporarily in the form of code groups prior to use in which changes in the stored data may be readily effected. It is a more detailed object to provide a translating device for a computer in which data is entered on a storage device by means of a keyboard and in which changes may be effected by a backspacing key with automatic erasure of erroneuos data.

It is still another object to provide an improved method of translation which enables a corresponding binary number to be available for computation at a speed which is limited only by the ability of an operator to strike the proper keys on the keyboard. A further object is to provide methods of conversion from binary code groups to a binary number and from a binary answer back to binary code groups respectively utilizing a novel and simple sequence of operations performable by a computer capable of adding, subtracting, multiplying, and dividing.

It is an object of the invention in one of its aspects to provide novel means for converting from the so-called parallel representation of digits to the serial or sequential mode of representation.

It is a further object to provide, in a sequential binary computer having an arithmetic unit and a control unit therefor, improved means for causing a plurality of switching circuits to be set up in sequence during the time allotted by operation upon a single binary number.

It is a still further object to provide an electronic computer capable of translation which includes a rotating recording device and in which data is simultaneously recorded in various positions for later reading from any selected one of said positions.

Other objects and advantages of the invention will be apparent from the following detailed description taken in connection with the accompanying drawings in which.

Figure 2:
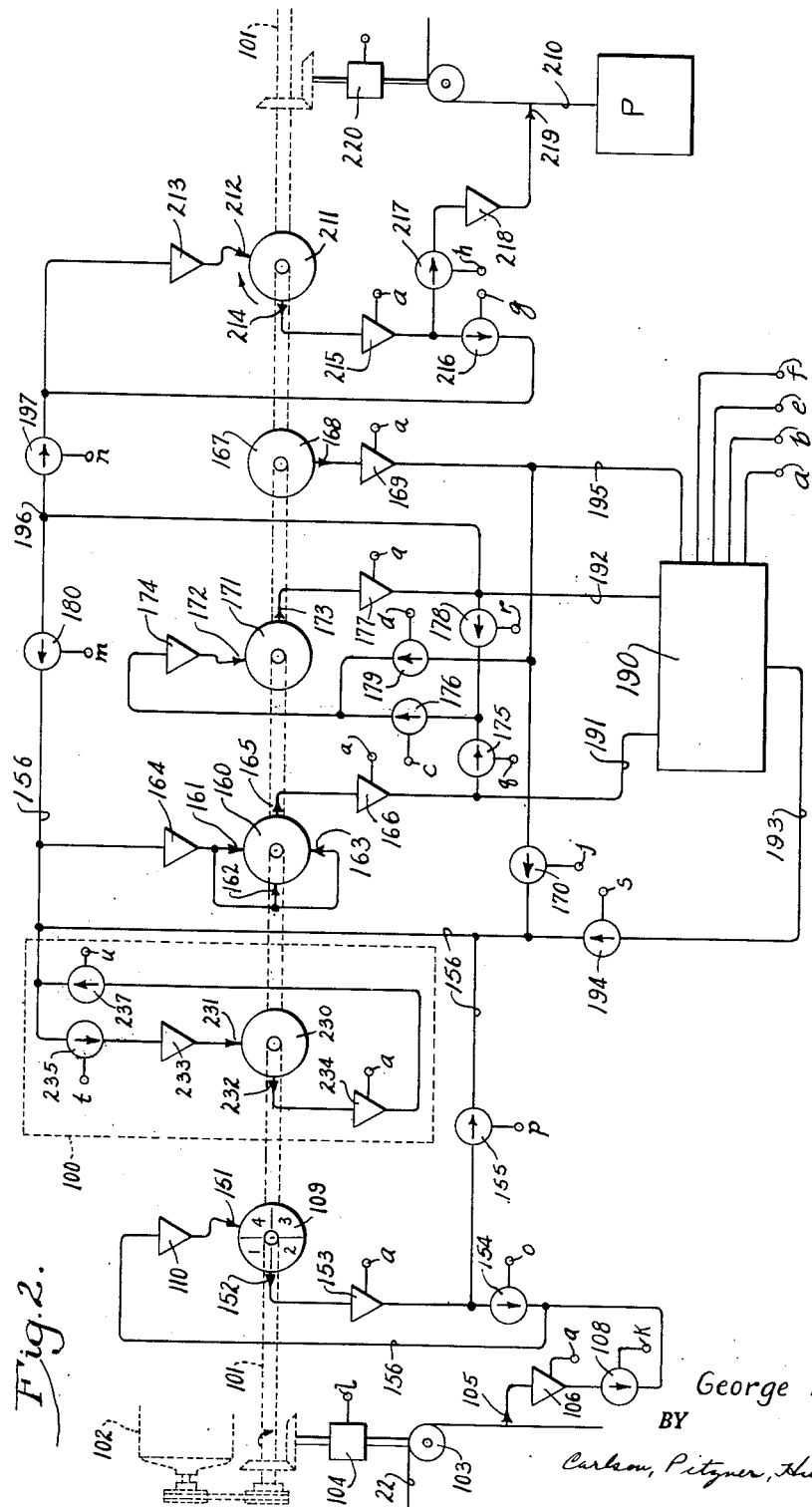
Fig. 2 is a schematic block diagram of an arithmetic unit forming a part of my invention for use with the coding device of Fig. 1.
Figure 3:
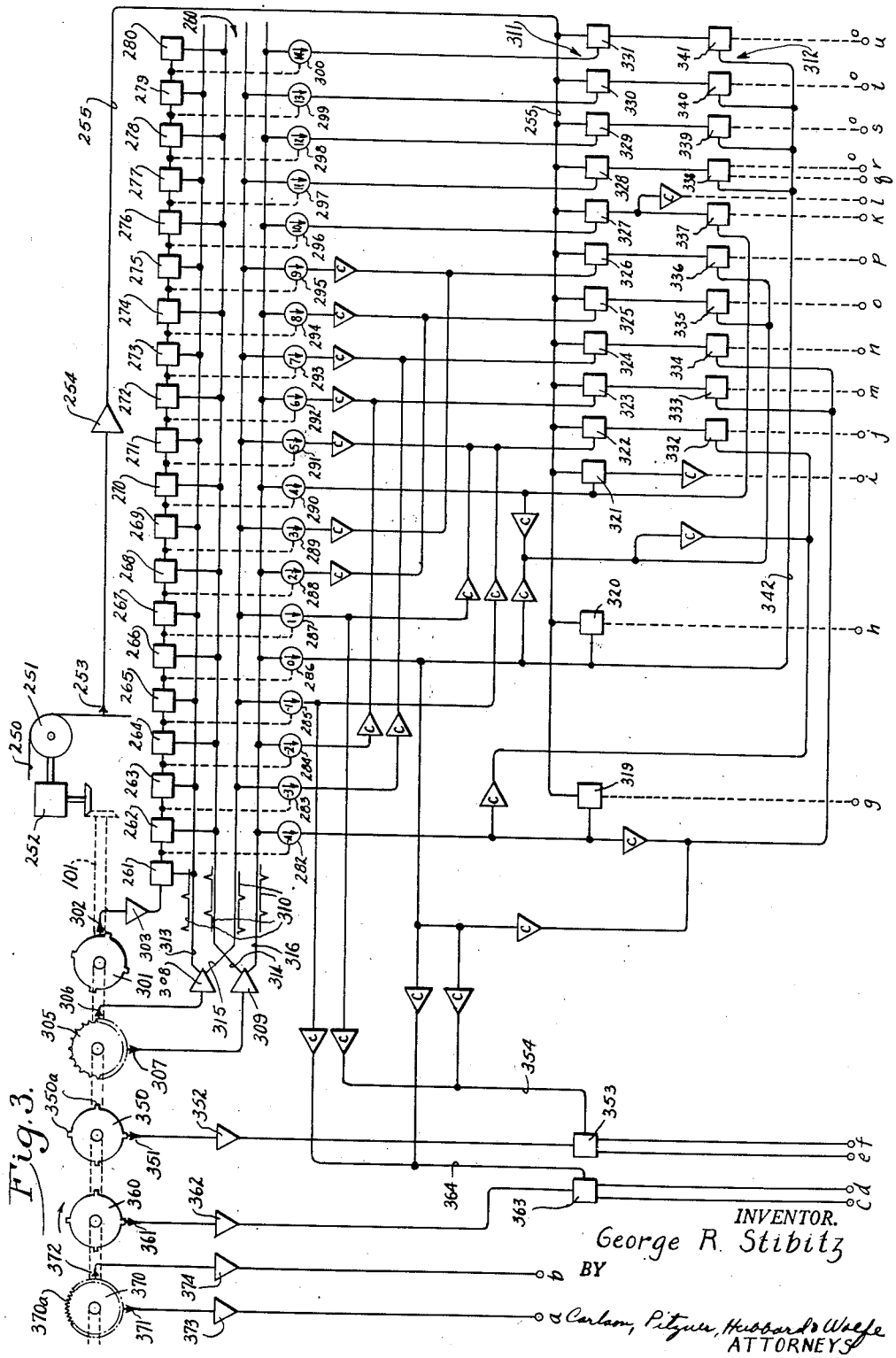

Fig. 3 discloses schematically a control unit for controlling the flow of data in the arithmetic unit of Fig. 2.

Figure 4:
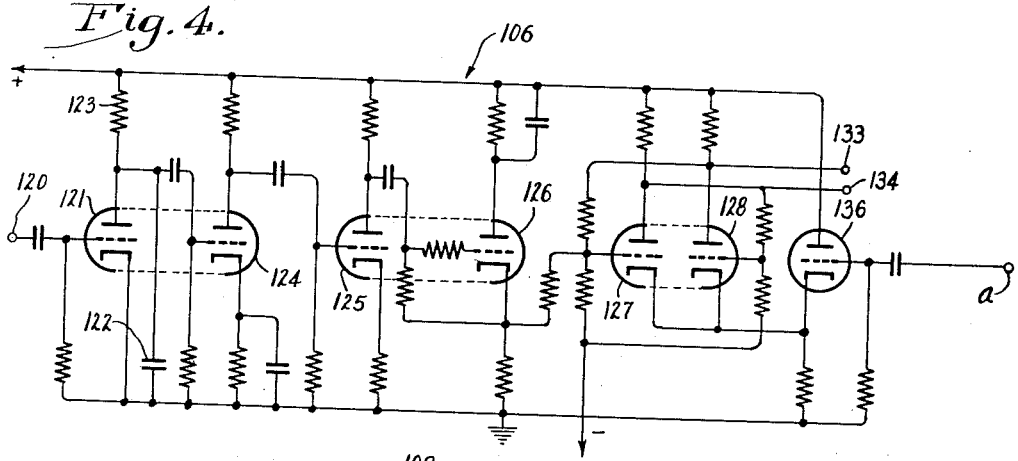

Fig. 4 is a schematic diagram of a pickup amplifier for use with a pickup head and having means for triggering to produce a square wave output.

Figure 5:
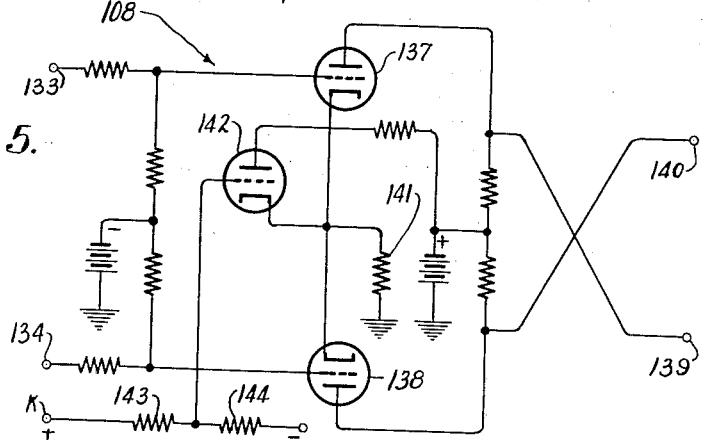

Fig. 5 is a schematic diagram of a double-pole switch employed in the present invention.

Figure 6:
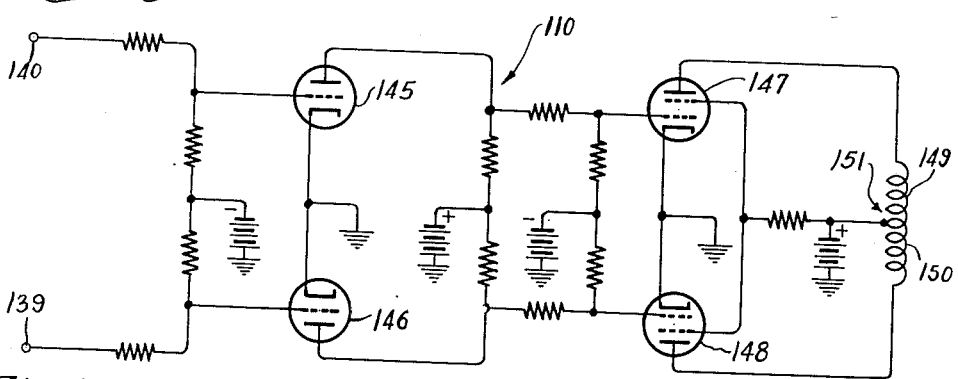

Fig. 6 is a schematic diagram of a recording amplifier.

Figure 7:
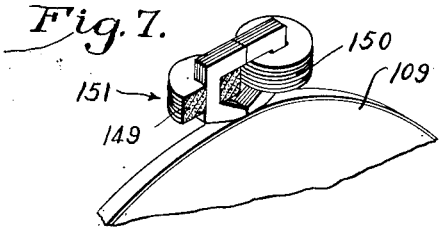

Fig. 7 is a fragmentary view of one of the magnetic disks having a head cooperating with the edge thereof.

Figure 8:
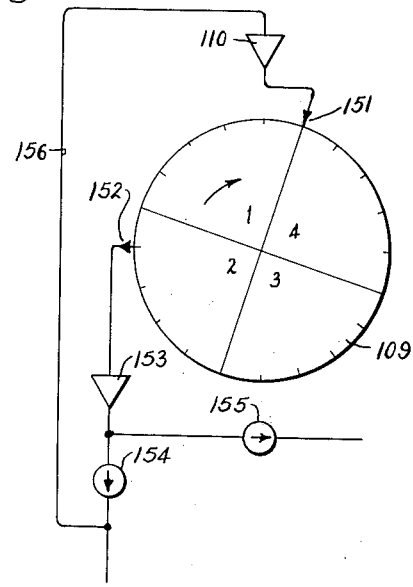

Fig. 8 is an enlargement of a portion of Fig. 2 illustrating the manner in which code groups are successively advanced on the input disk.

Figure 8A:
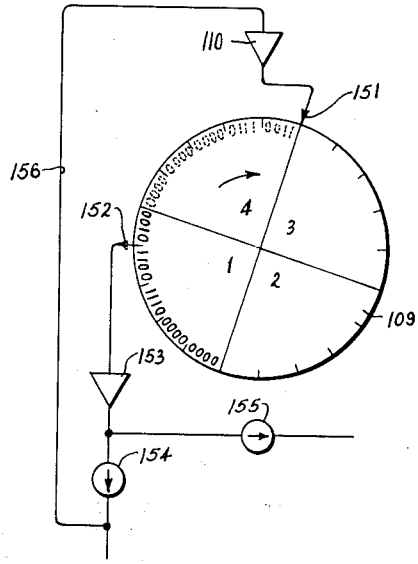

Fig. 8a is similar to Fig. 8 showing the disk in a subsequent position.

Figure 9:
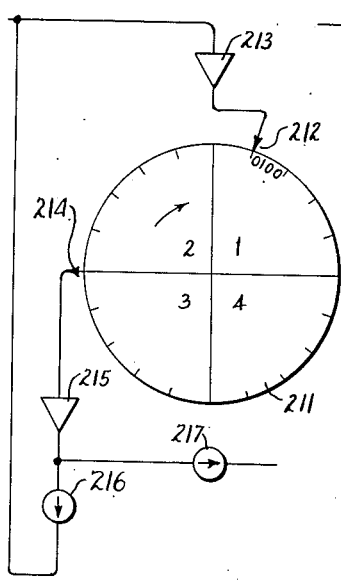

Fig. 9 is an enlargement of the right-hand portion of Fig. 2 showing the manner in which code groups are successively advanced on the output disk.

Figure 10:
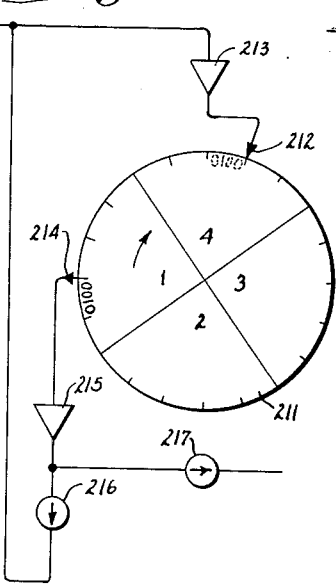
Figure 10A:
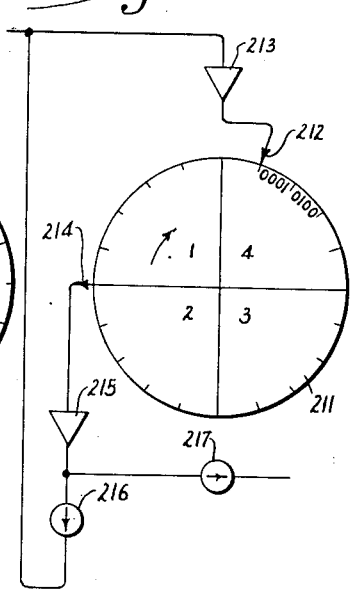

Figs. 10 and 10a illustrate successive positions on the output disk.

Figure 11:
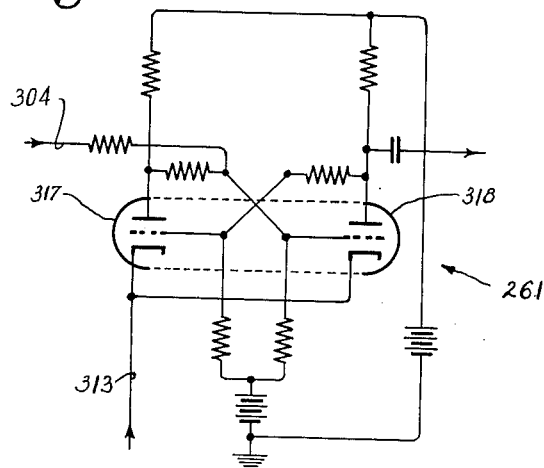

Fig. 11 is a schematic diagram of a flip-flop device.

Figure 12:
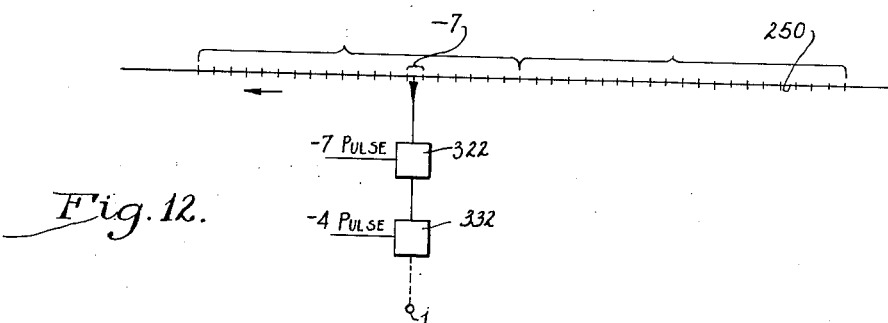

Fig. 12 is a stop-motion diagram of a moving tape showing its relation to a conditioning flip-flop device and the associated output flip-flop device.

Figure 12A:
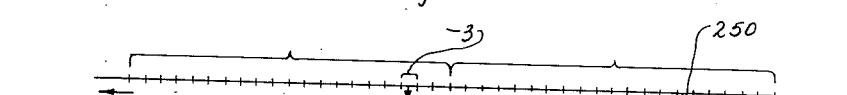
Figure 12B:
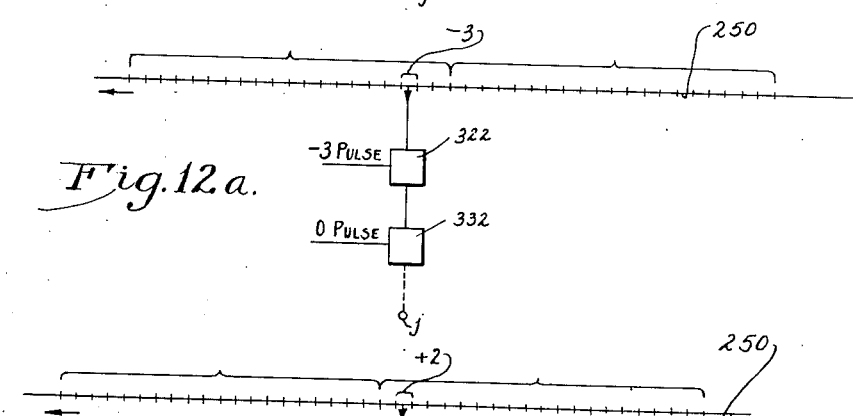

Figs. 12a and 12b are diagrams similar to Fig. 12 but showing the tape in successive positions.

Figure 13A:
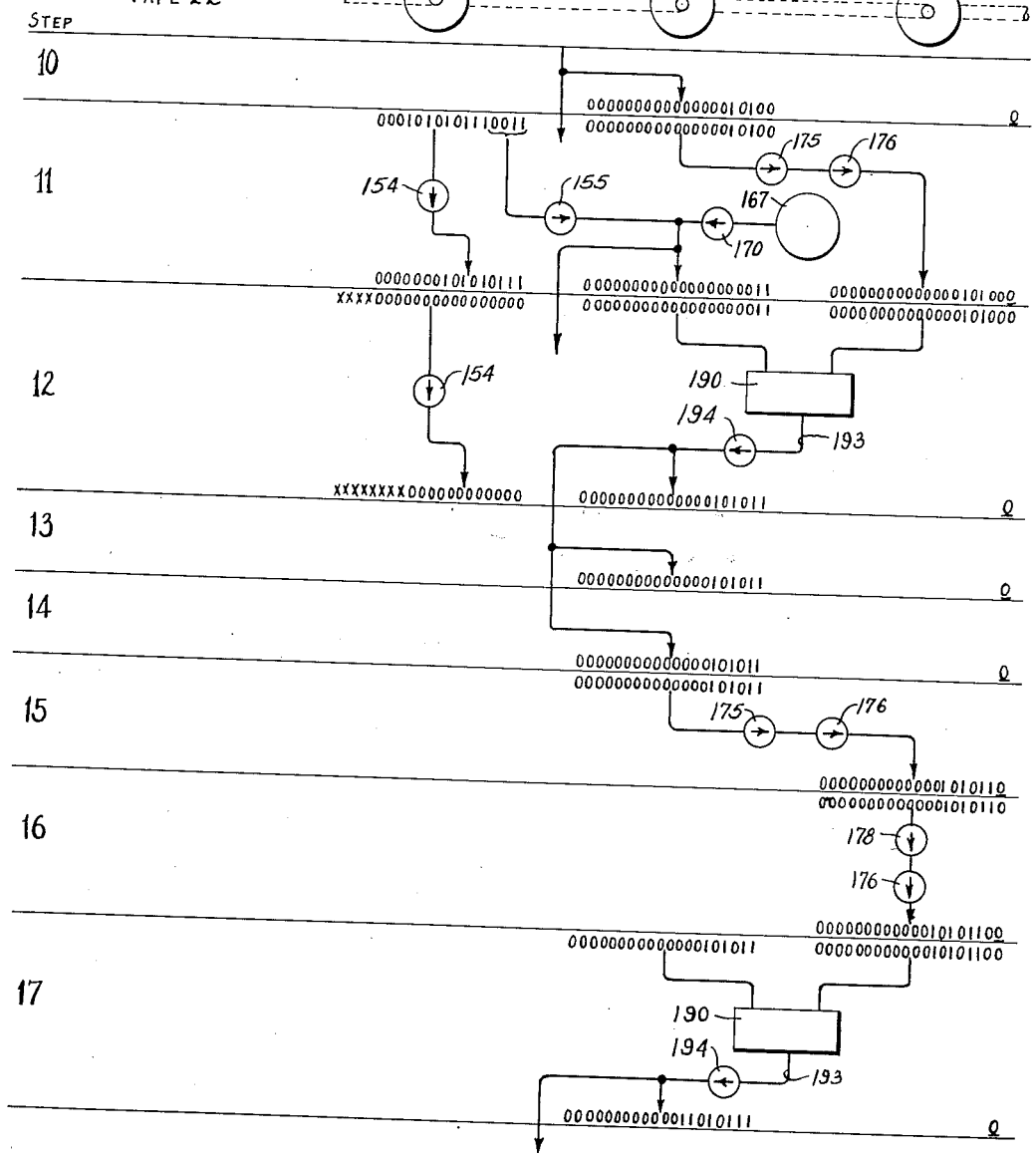

Figs. 13, 13a and 13b constitute a data flow diagram of a typical decimal to binary translation in the circuit of Figs. 2 and 3.

Figure 14:
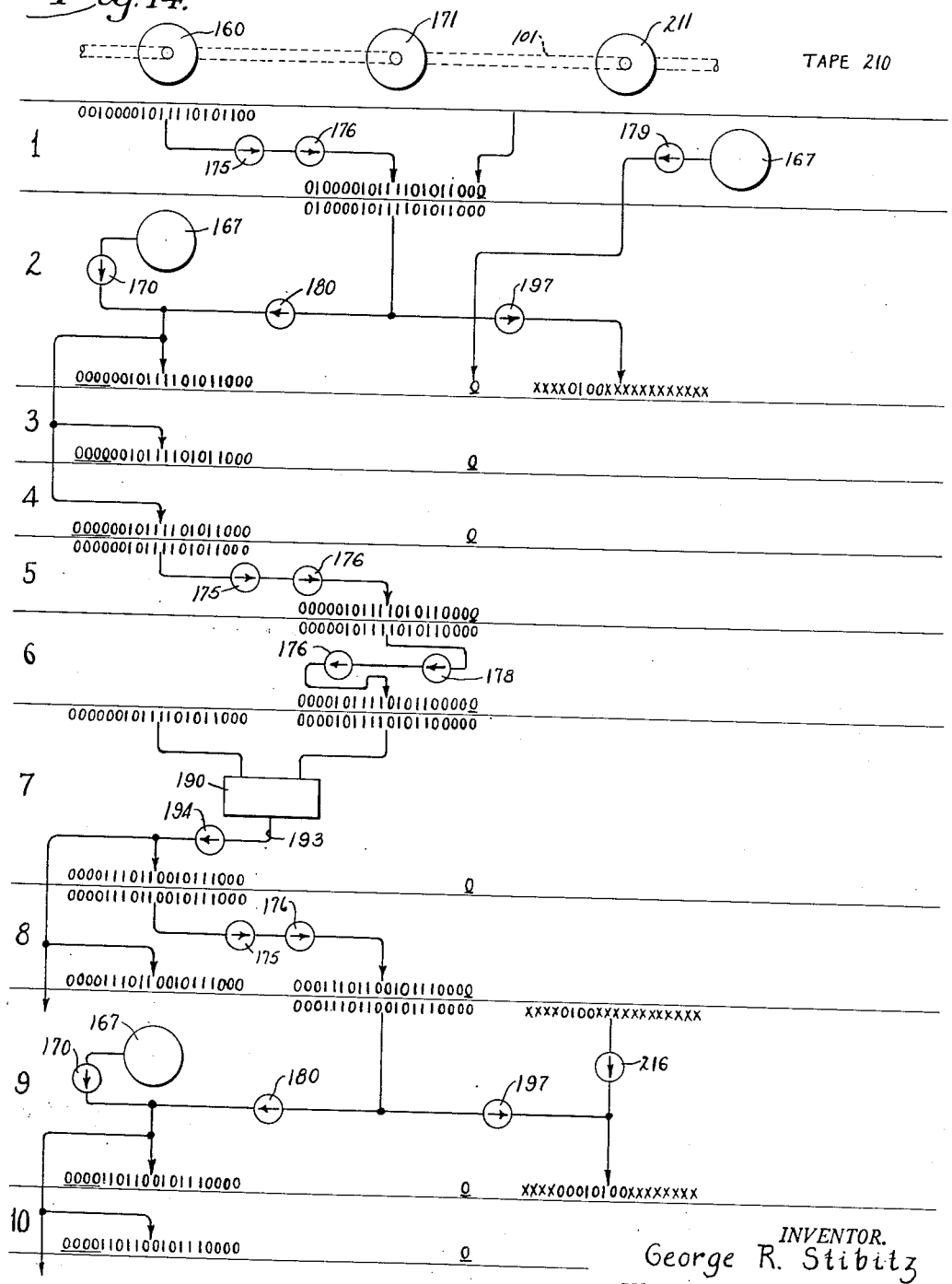
Figure 14A:
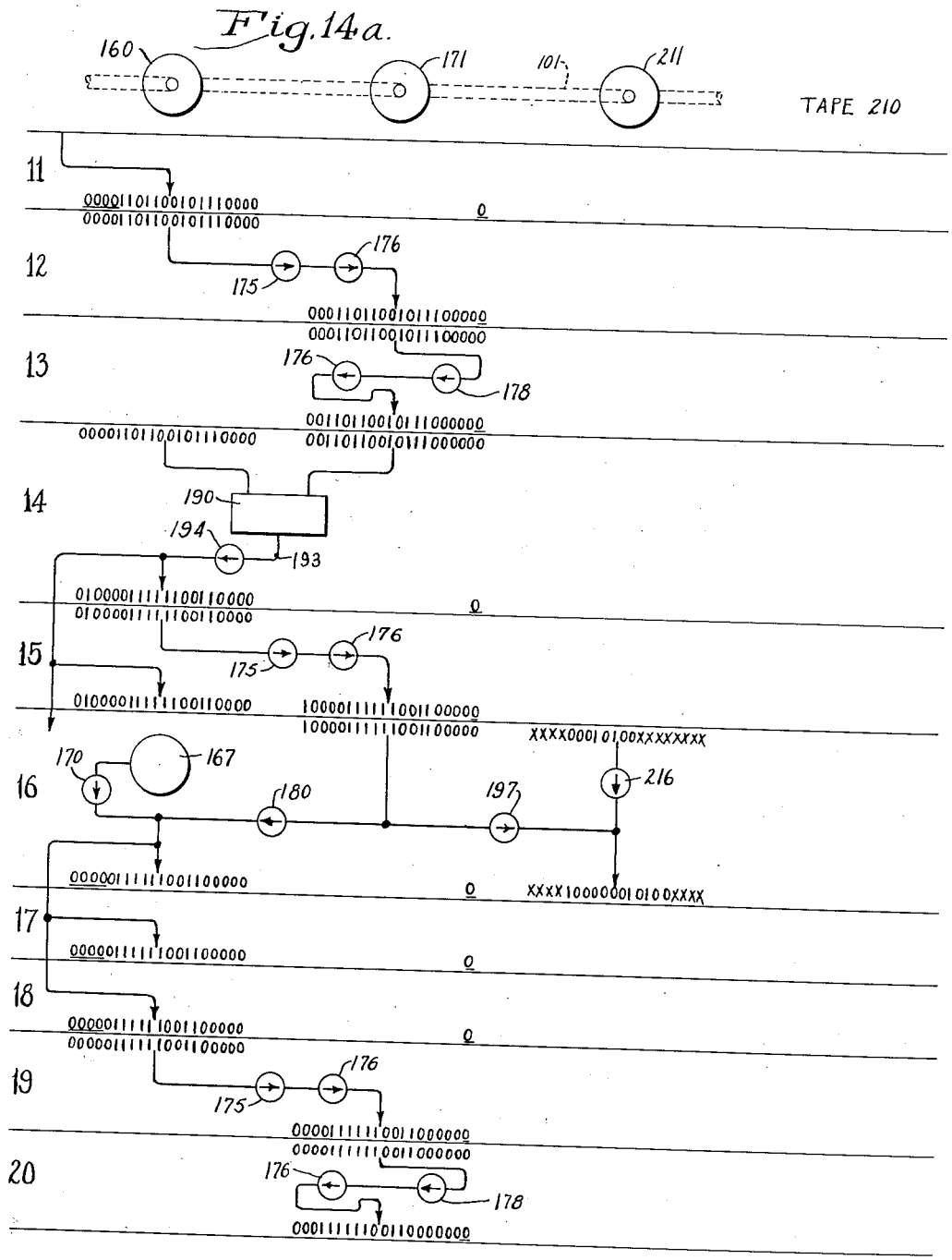
Figure 14B:
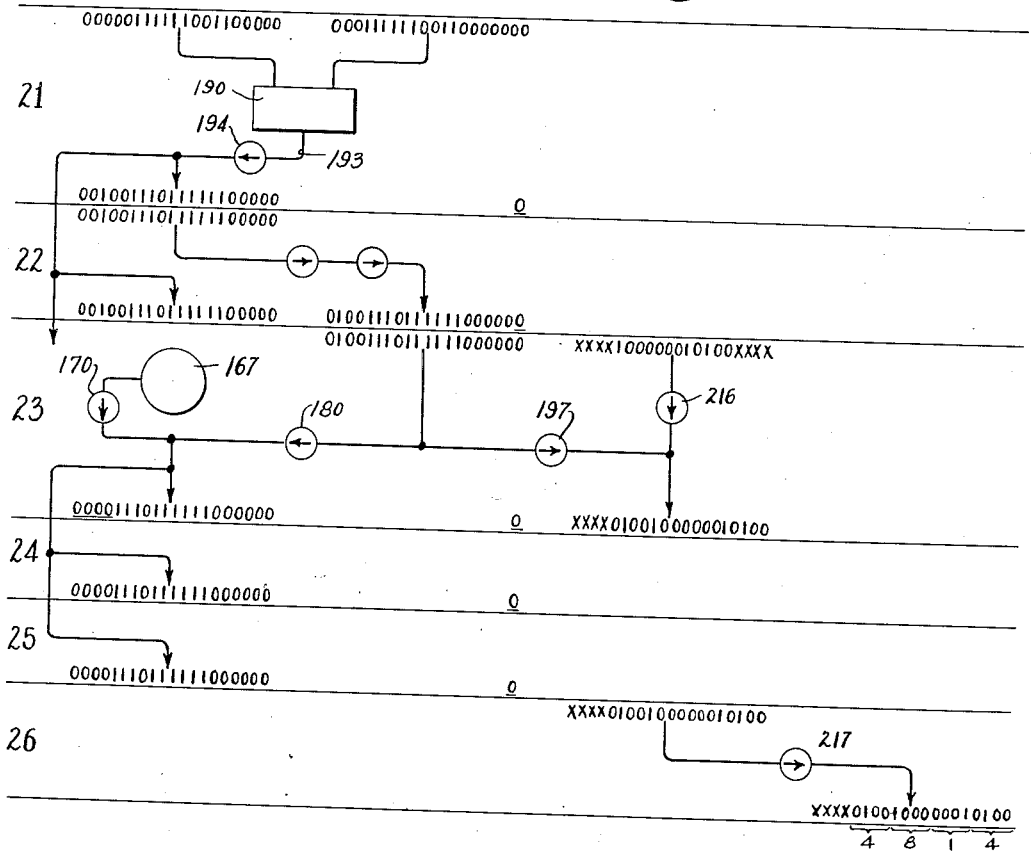

Figs. 14, 14a and 14b form a data flow diagram covering the translation of a number from the binary system to a form in which it may be utilized in a decimal printer.

While the invention is susceptible of various modifications and alternative constructions and uses, I have shown in the drawings and will herein describe in detail one embodiment of the invention. It is to be understood that I do not intend to limit the invention by such disclosure, but aim to cover all modifications and alternative constructions and uses falling within the spirit and scope of the invention as expressed in the appended claims.

In the Stibitz Patent 2,609,143 on Electronic Computer for Addition and Subtraction, which issued on September 2, 1952, and Patent 2,701,095 on Electronic Computer for Division, which issued on February 1, 1955, electronic computing apparatus is disclosed employing the binary system of numbers. Such computing apparatus is of the sequential type in which a number comprising the data is acted upon digit by digit progressing from the lower to the higher orders. Each of the digits is represented electrically by means of a voltage wave or "couple." A binary zero (0) for example is represented by a couple consisting of a negative and then a positive pulse while a binary one (1) is symbolized by a plus-minus pulse sequence. Representation of the digits in this fashion is accompanied by a number of important advantages which are rather thoroughly covered in the prior applications. Suffice it to say that the computer may be made self-checking in operation so that any error is immediately apparent; failure of any essential element of the computer is immediately recognized and the source of the difficulty readily traced. The same representation of the two binary numbers is employed in the apparatus herein disclosed.

Since the decimal system of numbers is universally used, full utility of binary computers requires that means be provided for translating the numbers comprising a problem into the binary system and later translating the answer back into the form in which it may be used by a printer capable of printing numbers in decimal form. At the outset it will be helpful to focus attention on translation from the decimal to the binary system. In practicing the invention, this is preferably accomplished in successive steps. The first of such steps includes the entering of the decimal number on the keyboard of a novel coding device which is effective to temporarily store the decimal number in the form of binary code groups. Subsequently the data is read from the storage medium, converted into modified code groups suitable for use in a binary computer, and then acted upon in accordance with a novel sequence of operations to produce the corresponding binary number. Such sequence of operations is directed by means of a control unit and according to control data previously entered on a tape or similar storage device. This constitutes the "down" translation. The binary number may then be used along with other binary numbers to solve the problem at hand. After the binary answer has been obtained the answer is again operated upon by the computer in a sequence of operations directed by the control tape to produce a series of binary code groups indicative of a decimal answer. The latter may then be fed into an appropriate decimal printer to complete the "up" translation. For purposes of convenience, the discussion which follows will be divided into sections corresponding to the foregoing steps. In spite of the apparently involved nature of the procedure, the operation of the present apparatus is inherently so rapid that the translation itself requires much less time than is required for an operator to enter the decimal digits on the keyboard.

CODING DEVICE

Figure 1:
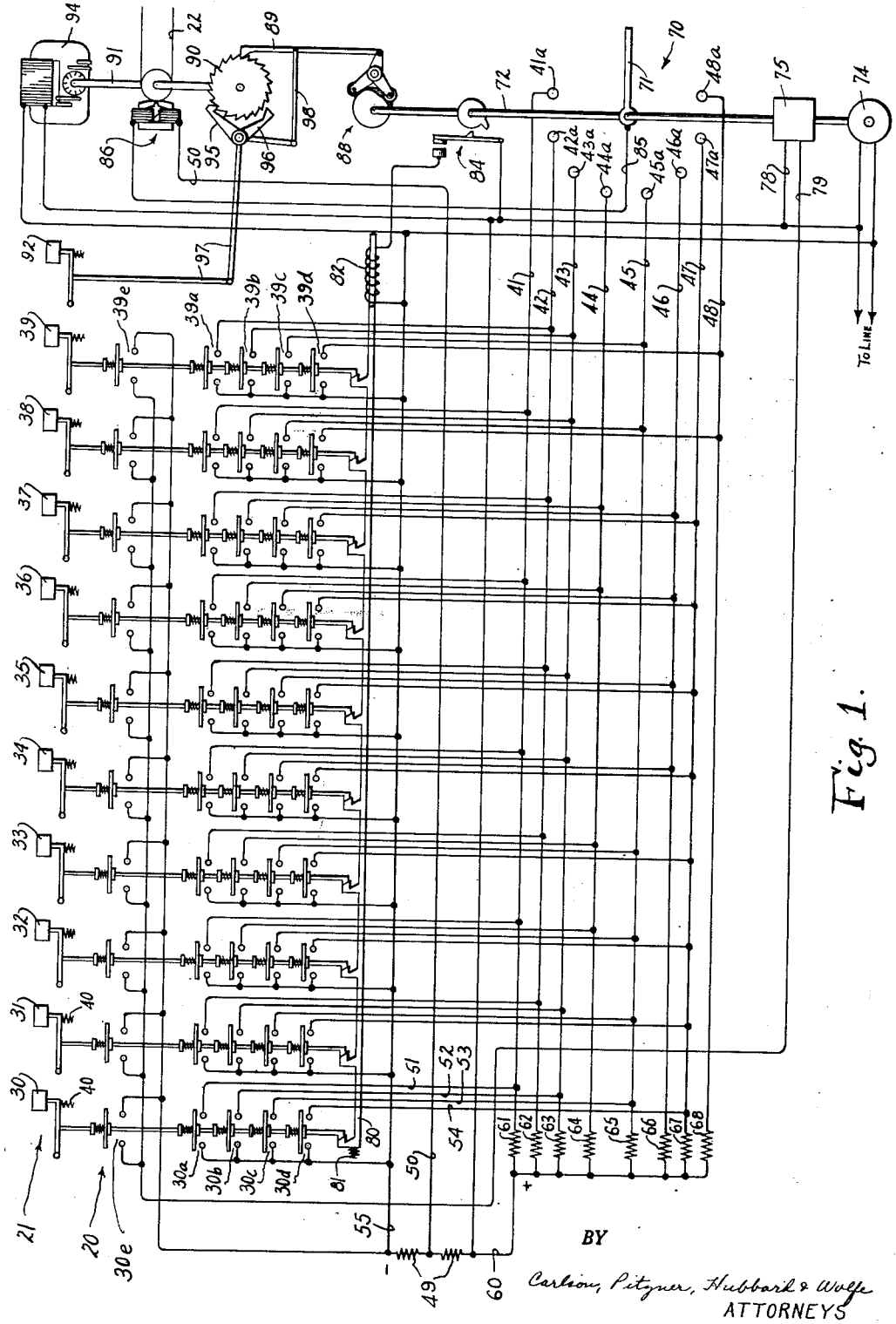
Figure 1 shows a coding device constructed in accordance with the invention having a keyboard for entering decimal data together with means for converting such data into binary code groups.

Referring to Fig. 1, a novel coding device 20 is disclosed having a series of ten digit keys indicated at 21 on which data may be manually entered and having an output storage device preferably in the form of a tape 22 on which the data is temporarily recorded in the form of a code. The data keys have been numbered 30—39 respectively and preferably have a quick return action such as employed in adding machines of the digitary type, quick return being facilitated by return springs 40 associated with each of these keys.

In practicing the invention, operation of any one of the keys is caused to set up a "parallel" code group of binary digits, each digit being represented by a minus-plus or a plus-minus voltage couple. The digits thus set up are then spaced in time or made "sequential" by means to be discussed, the voltage couples corresponding thereto flowing in sequence through a line 85 for temporary recording on the tape 22. Further in accordance with the invention, each of the code groups is so constituted as to be the binary representation of the corresponding decimal digit. For example, the number 4 is represented by a four digit code group 0100, while the decimal digit 8 is represented by the binary equivalent 1000. To accomplish the above, each of the keys includes means for setting up on a series of collector contacts a predetermined sequence of positive and negative voltages. Upon connecting the contacts successively to the output line the same sequence of voltages is transmitted through the line 85 for temporary recording on the storage tape. Since four couples are used herein for representing each decimal digit, a total of eight pulses are required and eight collector contacts are used. The voltage supply lines for the contacts are designated 41–48 in Fig. 1 while the contacts are designated 41a–48a.

Means are provided for applying negative voltage and positive voltage to the contacts in predetermined combinations. In the present instance this is accomplished by connecting all of the lines normally to a source of positive voltage through individual dropping resistors and then applying an overriding negative voltage to predetermined ones of said lines. Positive voltage is derived from a bus 60 and the individual dropping resistors are designated 61–68 respectively. Since no current is drawn through the latter the full positive voltage will normally appear on the contacts 41a–48a. Negative voltage on the other hand is obtained from a bus 55 and is applied to certain ones of the lines by switches associated with each of the keys. In the case of the key 30 for example the switches are designated 30a–30d and are connected to the lines by leads 51–54 respectively. Closure of one of the switches makes the line connected thereto negative.

To establish a reference voltage midway between the negative voltage of bus 55 and the positive voltage of bus 60 a voltage divider 49 is used having a mid-tap connected to a reference voltage bus 50.

It will be apparent then that with the lines 41–48 disengaged or floating they will all be positive; however, with certain of the lines connected to the negative bus, such lines will assume a negative potential and a voltage drop equivalent to the line voltage will exist across the associated ones of the resistors 61–68. In the case of the key 30 previously referred to, it will be noted that the lines 51–54 are connected to supply negative voltage upon depression of the key to voltage supply lines 41, 43, 45, and 47, producing the following sequence of voltages on the lines 41–48: — +, — +, — +, — +, denoting the binary digits 0, 0, 0, 0 respectively. It will be apparent then that using the connections shown in the drawing, the following codes will be set up by the keys 30–39.

| Key | Decimal Digit | Code Group |
|-----|---------------|------------|
| 30  | 0             | 0000       |
| 31  | 1             | 0001       |
| 32  | 2             | 0010       |
| 33  | 3             | 0011       |
| 34  | 4             | 0100       |
| 35  | 5             | 0101       |
| 36  | 6             | 0110       |
| 37  | 7             | 0111       |
| 38  | 8             | 1000       |
| 39  | 9             | 1001       |

In accordance with one of the aspects of the invention, a recording head is connected to the neutral or reference bus and is fed by a collector wiping each of the contacts 41a–48a in turn. The collector indicated at 70 has a rotating arm 71 which is connected to a shaft 72. In order to drive the collector arm through only one cycle upon depressing one of the keys on the keyboard, the shaft 72 is driven from a motor 74 via a single revolution clutch 75. The latter has input leads 78, 79 which are operated by a series of auxiliary switches 30e–39e associated with the respective keys 30–39. Upon depression of any one of the keys, the auxiliary contacts connected thereto close causing the clutch 75 to execute a single revolution and then come to a stop. In order to insure that the voltages are properly set up on the collector terminals before the clutch is energized, somewhat greater contact spacing may be employed in the case of the auxiliary switches as illustrated in Fig. 1. The clutch 75 may be of any desired design capable of causing a single revolution of the output shaft upon electrical energization and may, for example, be of the type shown and described in Patent No. 2,232,166 dated February 18, 1941.

In order that contact may be maintained during the full time required for the rotation of the collector arm, each of the keys is provided with a latch connected to a latch bar 80. This bar is normally biased into its latch engaging position by means of a biasing spring 81. Release is effected by a solenoid 82 which is operated by means of a cam switch 84 on the shaft 72. The cam is preferably formed to operate the switch contacts abruptly upon completion of each revolution.

The output voltages from the collector are fed via a lead 85 to the recording head 86. Such output head is preferably of the design shown in detail in the above copending Stibitz applications. The recording circuit is completed through the neutral bus 50 so that the magnetism produced by the head corresponds at all times to the polarity of the voltage being applied thereto.

For the purpose of advancing the tape 22 past the head 86, a ratchet drive mechanism is used including a double roller cam 88, a pawl 89 reciprocated thereby and a ratchet wheel 90 mounted on the tape drive shaft 91. The cam drive is so constructed that rotation of the shaft 72 will cause smooth advancement of the ratchet wheel 90 over the time interval corresponding to the wiping of the contacts 41a–48a. The cam drive is further constructed so that return movement of the pawl 89 takes place during movement of the collector arm 71 over the "dead" sector at the right-hand side of the collector. It will be apparent, therefore, that when one of the keys is depressed, rotation of the collector will cause a series of voltage impulses to appear on the lead 85 and a corresponding series of magenitc spots to be recorded on the tape 22. These spots taken in pairs form magnetic couples indicative of the binary digits in the code group.

In accordance with one of the more detailed aspects of the invention, means are provided for enabling a correction to be made on the magnetic tape after one or more of the keys 30–39 have been improperly pressed. To this end a backspacing key 92 is used having mechanism associated therewith for backing of the tape one step for each stroke thereof. In the present instance, the backspacing device includes a torque motor 94 which is continuously energized to apply a constant torque to shaft 91 which is opposite to the direction of ratchet drive. The torque is sufficiently low, however, so that the ratchet mechanism can successfully oppose it during normal operation. To insure that reverse movement of the tape is limited to one step for each stroke of the backspace key, a backspace escapement is used which consists of a pair of ratchet fingers 95, 96 constructed as a unit in the manner of a bell-crank. These ratchet fingers are connected to the key 92 by means of linkage 97. The teeth of the fingers are so spaced that upon depression of the backspace key, finger 96 engages the ratchet wheel while finger 95 releases it. At the same time, the ratchet pawl 89 is released through linkage 98. Consequently, rotation of the ratchet wheel will take place in the reverse direction through an arc corresponding to one-half a tooth length. Subsequent release of the key 92 will cause the ratchet finger 96 to be released and the finger 95 to become active resulting in movement of the ratchet wheel equivalent to an additional half tooth. For each stroke of the backspace key therefor, reverse movement of the tape 22 will take place which is equivalent to one complete tooth on the ratchet.

After return movement of the tape, the proper key may be depressed causing a fresh series of eight magnetic spots to be recorded on the section of tape which previously carried erroneous data. It is to be particularly noted that each voltage couple produces corresponding spots of magnetism and that there is no portion of the tape which remains unmagentized. Since the magnetic intensity produced by the recording head is much greater than the magnetic intensity retained by the tape, it will be apparent to one skilled in the art that the addition of fresh spots of magnetism will act automatically to cancel the spots of magnetism no longer desired. This makes it unnecessary for any special erasing device to be employed.

ARITHMETIC UNIT

Conversion from the binary code groups recorded on the tape by the coding device into a true binary number is performed by the circuit of Fig. 2 under the control of the control unit shown in Fig. 3. A portion of Fig. 2 is set off by dotted outline 100 and this portion is a memory unit for short term storage of binary digits. It is included because of the flexibility which it contributes to the computing process and is not actually used in the process of transformation to be described.

The mechanical part of the arithmetic unit includes a shaft 101 which is continuously driven by an electric motor 102. The data tape 22 supplying the input signal to the arithmetic unit is fed by a sprocket 103 which is advanced by rotation of the main shaft 101 through a so-called "B" clutch 104. This clutch is electrically energized through a control terminal $l$ and is preferably constructed in accordance with the disclosure of Patent No. 2,013,649 dated September 10, 1955. Since the shaft normally rotates at a speed on the order of 1800 R. P. M. the clutch must be both rapid and positive. Cooperating with the tape 22 is a pickup head indicated schematically at 105 which is preferably constructed in the same manner as the recording head 86 referred to in connection with Fig. 1. The output of the pickup head 105 is fed through an amplifier 106 and thence into an electronic switch 108 which allows the data to pass when appropriately controlled or energized by a terminal $k$ from the control unit. As will later appear the lettered terminals of Fig. 2 are in each case connected to correspondingly lettered terminals in Fig. 3.

Since the data is received from the coding device in coded groups of four binary digits for each decimal digit, it is necessary for the computer to act upon four of the digits on the data tape at a time. It is, however, not practicable to construct a clutching mechanism capable of starting and stopping the data tape sufficiently quickly to enable four digits and only four to be fed into the computer. Consequently, a cyclically separating endless storage means in the form of an input disk 109 is employed to store all of the numbers read from the tape in one operation until such time as they can be used in the computer. Information is recorded on disk 109 through a recording amplifier 110.

The pickup amplifier 106, the switch 108, and the recording amplifier 110 are typical of similar units used throughout the arithmetic unit. It will therefore be helpful to refer briefly to the specific circuits which have been used in the preferred embodiment. By way of introduction, however, it should be noted that Fig. 2 is in greatly simplified block form with a single lead to show the path of data flow. In the actual translation twin channels are used, the circuits associated therewith being connected back to back analogously to the well known push-pull amplifier circuit.

Referring to Fig. 4 which discloses the pickup amplifier 106, the left-hand input terminal 120 is connected to receive an input signal at a low level from the pickup head 105. As the magnetized spots on the tape 22 are moved past the air gap in the head 105, the flux set up in the magnetic circuit thereof produces a voltage in the pickup coil which is proportional to the rate of change of flux. After amplification by a triode 121, this voltage is integrated by a capacitor 122 and resistor 123, the voltage across the capacitor being then proportional to the flux. This voltage is further amplified by triodes 124, 125, 126 and applied to the grid of the following stage. This stage consists of a flip-flop circuit having triodes 127, 128. The plate terminals of the triodes are connected to the output terminals 133, 134 which are oppositely phased for feeding the circuit of Fig. 5.

The flip-flop circuit including the triodes 127, 128 remains in one of two stable conditions except when a positive "unlocking" pulse is applied. This unlocking pulse is received through the pulse terminal $a$ from the control unit. Between the terminal $a$ and the flip-flop circuit is interposed a cathode follower 136 so that whenever an unlocking pulse is received at the unlocking terminal *a*, both of the tubes in the flip-flop circuit are cut off and become non-conducting. When the unlocking pulse is removed, the flip-flop stage will assume a condition which is dependent upon the then existing condition of the volage at the input. As will later appear, the flip-flop stage receives an unlocking pulse once for each magnetized spot on the magnetized tape 22 so that the output of the pickup amplifier at terminals 133, 134 is a full square wave of voltage for each binary digit, rather than a sine wave.

Attention may next be given to the circuit of the switch 108 (Fig. 5) which has input terminals 133, 134 connected to correspondingly numbered terminals at the output of the pickup amplifier. This switch includes tubes 137, 138 having plate terminals 139, 140 respectively. The grids of the tubes are controlled by the input terminals while the cathodes are jointly connected to ground through resistor 141. Also connected to ground through common resistor 141 is triode 142 which has its grid connected to the control terminal *k* through resistor 143. When a relatively low positive control voltage is applied to terminal *k*, the voltage divider made up of resistors 143 and 144 applies a negative voltage to the grid of triode 142 causing it to be cut off. The bias voltage developed across resistor 141 will then be relatively low and under these conditions the tubes 137, 138 will be in a state which permits conduction when directed by the input on terminals 133, 134. It will be apparent that the voltage at the input terminals will be reflected as corresponding voltages at the output terminals and the switch may be considered as turned on. There will, of course, be a phase inversion in the switch but this is taken care of by the simple expedient of transposing the output terminals 139, 140 as shown. In operation when the voltage applied to the terminal *k* is highly positive the triode 142 becomes heavily conducting raising the voltage drop across resistor 141 which in turn biases tubes 137, 138 to cutoff. The switch may then be considered as turned off.

To insure that information is recorded on the input disk 109 at a reliable level, two stages of amplification are used in the recording amplifier, the diagram of which is set forth in Fig. 6. The input terminals 139, 140 are connected to correspondingly numbered terminals on the switch and feed into the grids of tubes 145, 146. The latter in turn drive the tubes 147, 148 which are connected to respective portions 149, 150 of the recording coil 151. These coils are wound in such a direction on the recording head that energization of one of them produces magnetism of one polarity while energization of the other produces magnetism of the opposite polarity. Since a double channel is used throughout the arithmetic unit as exemplified by the circuits of Figs. 4, 5, and 6 just discussed, the recording head will be dead in the absence of an input signal from the data tape or other signal source. More specifically, if the switch 108 is set to the "off" condition by the control voltage applied to terminal *k*, tubes 137 and 138 will be cut off as explained earlier. This results in a relatively high positive voltage on leads 139 and 140 causing both of the tubes 145 and 146 to conduct. Conduction of these tubes lowers the voltage applied to the grids of tubes 147 and 148 and causes both of these tubes to be cut off. Thus no current flows thru the coils 149 and 150 and no demagnetizing force is exerted by the recording head.

Having understood the means used for conducting an input signal to the input disk 109 more detailed consideration may be given to the construction of the disk and the cooperating recording and pickup heads thereon, the latter being designated 151, 152 respectively in Fig. 2. Disk 109 driven by the shaft 101, has a magnetic periphery on which data is stored in the form of north-south and south-north "couples" of magnetism. In the preferred form the disk is constructed of brass several inches in diameter and has a thin electroplated coating of nickel-cobalt alloy. The pickup and recording heads are closely coupled to the disk and are constructed as shown in Fig. 7. The view is somewhat enlarged and the gap between the pole tips will normally be approximately four thousandths of an inch and the gap between the pole tips and the tape or disk will be one to two thousandths. While the operation of the disk 109 will become apparent as the discussion proceeds it may be noted at this point that the periphery is divided for convenience into quadrants and each of the quadrants into five sectors for receiving successive binary code groups.

As previously mentioned, it is not practicable to start and stop the tape for each code group and consequently means are provided for reading a series of code groups from the data tape. In the present embodiment sufficient code groups are read from the tape to cover half the periphery of the disk 109. The disk movement is preferably so related to that of the tape that twenty digits occupy each quadrant. This corresponds to a recording of ten 4-digit code groups on one-half of the periphery.

In accordance with the invention in one of its aspects, means are provided for enabling the code groups to be read from the disk 109 and fed into the following portions of the computer one by one. To accomplish this reliably, means are provided for advancing the code groups one by one into a reference position on the disk 109, such reference position being at the beginning of one of the quadrants on the disk. In the present instance, this is accomplished by offsetting the recording head a distance corresponding to one code group (four digit spaces) in the direction of rotation of the disk and by providing a loop or feedback circuit from the pickup head back to the recording head. The manner in which the code groups are successively advanced into the reference position will be made clear upon reference to Fig. 8 which shows the disk 109 together with the loop circuit associated therewith. It will be noted that the pickup head 152 leads into a pickup amplifier 153 and thence through a switch 154, the latter being identical to the amplifier 106 and switch 108 previously discussed in connection with Figs. 4 and 5.

By way of example, suppose that the following three code groups are to be read from the tape 22 and recorded on the disk 109 for use by the computer: 0100, 0011, 0111. These correspond to the decimal digits 4, 3, 7 punched into the keyboard of the coding device. Since it is desirable that the first of such code groups be entered in the reference position at the beginning of quadrant 1, and since the recording head 151 is advanced, the control unit (to be later described) causes the movement of the tape 22 and actuation of the switch 108 to be delayed a period corresponding to four digits. It may be assumed that when time is zero the quadrants occupy the "reference" position shown in Fig. 2 so that after four digit intervals the disk will have advanced around to the position shown in Fig. 8. Consequently, the code groups are recorded on the periphery of the disk 109 beginning at the first number space in quadrant 1. It will be apparent then that when the first code group is advanced around into the region of the pickup head 152, the first code group, here 0100 may be read off, flowing through the amplifier 153, a switch 155 and onto a trunk line 156 leading to the next stages of the computer. To accomplish this, the switch 155 is closed only for one code group interval, i. e., just long enough to enable the passage of code group 0100. The position of the disk immediately thereafter is illustrated in Fig. 8a. It will be noted that at this instant the recording head 151 is at the beginning of a quadrant. Closure of switch 154 then completes a loop circuit which causes the second one of the code groups, namely 0011 to be read from quadrant 1 and moved up to the first or reference position of quadrant 4 followed by the succeeding code groups in quadrant 1. The code groups as they will appear when recorded in quadrant 4 are shown dotted. At the proper time during a succeeding revolution the code groups are again read by the pickup head 152. The second code group, namely 0011, is then fed into the remainder of the computer and the other code groups are recorded in quadrant 3, advanced four digit spaces relative to the start of the quadrant. This process is repeated over and over, the offset arrangement of the recording head 151 together with the loop circuit serving to advance each of the code groups successively into a position from which it may be read by the pickup head and fed into the successive portions of the computer. When all of the ten code groups have been exhausted, the "B" clutch 104 and the switch 108 are again energized by the control unit to feed ten more groups to the disk 109.

As a result of the operation of disk 109 and its associated circuit, the 4-digit code groups are passed along the trunk 156 individually as they can be utilized in subsequent steps of the translation process. As has been explained, each time that one code group is passed to trunk 156 through switch 155, the remaining code groups are advanced four digit spaces relative to a quadrant by being re-recorded on disk 109. The second code group is thus not available to be read by pickup head 152 until disk 109 has rotated three quarters of a revolution. If the second code group cannot be used at that time, it can be left unchanged on disk 109 and read any number of complete revolution later.

In accordance with one of the aspects of the invention, means are provided for making a code group available not only at a predetermined later time but at a number of later times spaced at intervals which are equal to the time required for the computer to complete one step of calculation. Means are further provided for recording the 4-digit code and for filling out the unused digits in the number space with a series of binary zeros, thus in effect converting the 4-digit code into a 20-digit code. All subsequent steps in the translation then utilize the 20-digit code group.

In the present embodiment, the above is accomplished by a step delay disk 160 having a plurality of recording heads 161, 162, 163 fed jointly through a recording amplifier 164 which is similar to the recording amplifiers previously referred to. The recording heads 161, 162, and 163 are spaced from one another by a complete number space which, in the present device, corresponds to an angle of 90 degrees. Spaced from the recording heads 161 and 163 by a full number space is a pickup head 165 which feeds into a pickup amplifier 166.

After the first code group has been fed into the line 156 and recorded on the disk 160, the switch 155 is turned off and the switch 170 turned on to supply a series of binary zeros to the disk 160. The latter are obtained from a zero generator disk 167 having a pickup head 168 and a pickup amplifier 169. This disk may be of the same type as previously discussed having a permanently magnetized series of alternate north and south poles about its periphery or, alternatively, may have teeth machined on its outer surface magnetized to form discreet poles. The composite 20-digit code group thus recorded on the disk 160 becomes

00000000000000000100.

This is entered simultaneously on the quadrants 4, 1 and 2 and may be read off one, two, or three steps later.

Prior to taking up the complete method of translation employed in the present device, it will be useful to note that means are provided for shifting binary numbers to the left relative to the binal point which is equivalent to multiplication by 2. This is accomplished by means of a multiplying disk 171 having a recording head 172 thereon which is offset from the pickup head 173 by an integral number of number spaces plus one digit.

This is substantially the same arrangement which is used in my Patent No. 2,701,095 which describes a computer for division. In the present instance, the recording head 172 is supplied by a recording amplifier 174 and via input switches 175, 176 or 178, 176. The pickup head 173 feeds into a pickup amplifier 177. A switch 178 interconnects such pickup amplifier and the input switch 176 to form a loop circuit. This enables a binary number read off of the disk 171 to be re-recorded thereon moved one digit place to the left. To prevent errors, it is desirable that the low order digit space "vacated" upon shifting to the left be filled with a zero. For this purpose, a zero inserter switch 179 is provided, connecting the output of the zero generator disk 167 to the recording amplifier 174. It will be understood that the zero inserting switch 179 will be turned on by the control unit only during the last digit space of a number space. The reason for this will be clear when it is considered that the last or high order digit recorded in one number space on the disk, because of the offset of the head 172 becomes the first or low order digit of the subsequent number. Provision is also made for enabling the binary number read from disk 171 to be fed into the input of disk 160 for a purpose to be discussed. A switch 180 for effecting this is shown along the upper edge of Fig. 2.

As will later appear, the process of translation also requires that two binary numbers to be added together and for this purpose, a summing circuit 190 is used having input leads 191, 192. The sum appears at an output lead 193 and may be fed to the trunk 156 by a switch 194. As shown in Fig. 2, the inputs to the summing circuit are respectively fed through the circuits from the disks 160 and 171.

The summing circuit 190 will not be discussed in detail since it is fully set forth in my Patent No. 2,609,143 and especially Fig. 10 thereof. It will suffice to say that binary numbers are fed simultaneously and in synchronism through the input leads 191, 192. The sum of the two numbers appears at the output lead 193. Since the summation is effected order by order starting with the digits of lowest order, the digits comprising the sum appear at the output without any time delay whatsoever. Provision is included within the summing circuit for automatically delaying a carry digit from one order so that it may be added with the digits comprising the next higher order. To insure that the carry digit is zero at the beginning of a summation, means are provided for inserting a zero. This is accomplished by feeding zeros through a supply line 195 from the zero generator disk 167. The terminals $a$, $b$, $e$, and $f$ correspond to the terminals of my prior device and their functions may be summarized as follows: Terminals $a$ and $b$ carry control pulses alternately and at half digit intervals as required by the carry delay circuit. Terminal $e$ controls a switch to turn off the carry digit during the summation of lowest order, while terminal $f$ controls a switch to connect the zero supply lead 195 to the summing circuit to effect the low order insertion of a single zero.

The output terminal of the arithmetic unit is indicated at 196 and the output is controlled by means of a switch 197. This completes the enumeration of the parts required for the translation from a decimal number expressed in binary code groups to a binary number. The problem can then be solved using the binary number.

After obtaining the solution to a problem it is desirable that the binary number forming the answer be translated into the same type of 4-digit code groups with which the arithmetic unit is supplied by the tape 22. As will be later discussed, this requires that the output of the computer at the switch 197 be in the form of 4-digit code groups which are separated from one another by an interval corresponding to several steps of computation. Just as in the case of the input tape 22, it is not possible to start and stop a magnetic tape recording device accurately for an interval of only four digits. Consequently, means are provided for collecting a plurality of 4-digit code groups and for subsequently recording them as a continuous series on a printer tape or output tape 210. This is accomplished by means of an output storage disk 211 having a recording head 212 fed by an amplifier 213. The output of the disk 211 is derived from a pickup head 214 which feeds into a pickup amplifier 215. A switch 216 interconnects the latter amplifier to the recording amplifier 213 to complete a loop circuit. After a sufficient number of 4-digit code groups have been collected on the output disk 211, they are fed to the tape 210 through a switch 217, a recording amplifier 218, and a recording head 219. The recording amplifier may be the same as shown in Fig. 6. During the time that the switch 217 is closed, the tape is advanced by the drive shaft 101 via a "B" clutch 220. These elements correspond in general to the driving arrangement at the input of the arithmetic unit.

In accordance with one of the aspects of the invention, the head 212 is advanced or offset in the direction of rotation by an amount equal in length to the coded group, here, four digit spaces. This enables data previously recorded on the disk 211 to be retained thereon but displaced at each revolution sufficiently to allow room for addition of subsequent binary code groups. The manner in which disk 211 operates to store a plurality of code groups before transferring them to the printer tape will be apparent upon inspection of Fig. 9. It will be assumed that the individual code groups are fed from the switch 197 as the last four digits of a number space, the switch being operated by the control unit of Fig. 3.

As a practical example, let us assume that the following code groups are produced in the arithmetic unit at spaced intervals and fed through the switch 197: 0100, 0001, and 1000 corresponding to decimal digits 4, 1, 8. Because of the offset head, the first of these will be recorded in the second last or fourth sector of quadrant 1 as shown. The second code group will not be produced in the arithmetic unit until several steps later, and in addition it may have to be purposely delayed in the arithmetic unit in order to be recorded in the proper quadrant of disk 211. Prior to recording of the second binary code group, the disk 211 rotates around to the position shown in Fig. 10. Upon additional rotation the first code group will be read from the fourth sector of quadrant 1 and recorded in the third sector of quadrant 4, four digit spaces advanced from its previous relative position. The position in which the code group is about to be re-recorded is shown dotted in Fig. 10. This leaves the third position or sector in quadrant 4 ready to receive the second code group. Immediately after the first code group is re-recorded, the switch 197 is turned on and the second code group 0001 is recorded in quadrant 4 as shown in Fig. 10a. It will be noted that we have now recorded two successive code groups, namely 0100 and 0001 on the output disk 211. In exactly the same way, additional code groups are added to the disk 211, the information previously recorded thereon being shifted four digit spaces to the right each time a new code group is available. Since the advance of the previously recorded groups can be accomplished only three-quarters of a revolution after it is recorded, or any number of complete revolutions thereafter; the new code group may have to be delayed in the arithmetic unit to obtain the proper timing relative to disc 211.

After a series of ten code groups have been recorded on the disk 211, we are then ready to transfer such code groups to the tape 210. This is accomplished merely by causing the switch 217 to close at an instant synchronized with the passage of the first code group past the head 214. At the same time that switch 217 is closed, the "B" clutch 220 is energized to cause timed advancement of the tape 210. After the series of code groups is recorded on the tape, the "B" clutch is deenergized, bringing the tape again to a halt and additional code groups are collected on the disk 211 for transferral a moment later to the tape. In this way the complete coded decimal answer is recorded on the tape. The tape is then fed into a printer capable of printing a decimal digit upon receipt of the code group corresponding thereto.

To complete the description of Fig. 2, the memory unit 100 includes a disk 230 having a recording head 231 and a pickup head 232. Associated with the latter are recording and pickup amplifiers 233, 234 respectively. The input of the disk is received through a switch 235 connected to the trunk 156. The output is fed to the same trunk via a switch 237 to complete a loop circuit. The disk 230 may be employed to store up the data used as a basis of a problem or, alternatively, may be used for short time storage of data during the solution of a problem. It will be apparent to one skilled in the art that the memory unit 100 adds to the flexibility of the device and a number of similar units may be employed if so desired, each being connected to the trunk 156 and controlled by appropriate switch control terminals in the control unit which will be next discussed.

CONTROL UNIT

As was stated in the preceding section, the process of translation takes place in a series of steps and for each one of these steps data must be routed in a predetermined manner through selected paths in the arithmetic unit. Each step thus requires the applicable switches to be set at the instant that a given step begins and, in general, to remain set until the beginning of the next step at which time a different combination of switch settings is required. The control of the switches in the arithmetic unit is thus the primary function of the control unit. In addition, it serves as a precise synchronizer not only insuring that the electrical control pulses are spaced properly and are in synchronism with one another, but also to insure that the electrical and mechanical portions are kept perfectly in step in spite of wide variations in the speed of the driving motor.

The control unit shown in Fig. 3 includes a series of control disks which are mounted for rotation with the shaft 101 which is an extension of the shaft shown in Fig. 2. This shaft also serves to drive a storage medium such as a tape 250 which carries the stored control of program data for causing the control unit to turn on the proper switches in the arithmetic unit during each step of the translation. The tape is driven through a sprocket 251 which is coupled to the shaft 101 by means of a "B" clutch 252, thereby enabling the tape to be started and stopped to start and stop the computation while the shaft 101 is running at full speed. Preferably the tape 250 includes the control data in the form of magnetic spots comprising north-south or south-north magnetic couples just as the tapes previously referred to. Control pulses are read from the tape by means of a pickup head 253 and associated pickup amplifier 254 feeding information into a control trunk 255.

Certain portions of the control unit to be described correspond generally to the control unit described in detail in my Patent No. 2,701,095 to which reference is made and the present description may thus be considerably shortened. One of the portions which corresponds to that previously used in the delay chain 260 which includes a series of flip-flop circuits 261–280 having output switches 280–300 respectively. The chain of flip-flop circuits receives an initiating pulse from a disk 301 having teeth thereon spaced at 90 degree intervals. This disk is advanced an amount corresponding to five digits in the direction of rotation of the shaft so that the initiating pulse occurs five digits ahead of a step of computation. The pulse is read from the disk 301 by means of a pickup head 302 feeding into a pickup amplifier 303.

In order that the flip-flop devices and their associated switches may be successively triggered at one digit intervals, a delay chain pulsing disk 305 is used having a pair of pickup heads 306, 307 and corresponding pulse amplifiers and phase inverters 308, 309. The latter may be of conventional type having output leads 313, 315 and 314, 316 on which appear voltages having the waveforms indicated at 310. It will be noted that the pickup heads 306, 307 control alternate ones in the series of flip-flop circuits 261-280. Further, the disk 305 has teeth spaced at 2-digit intervals, with one of the pickup heads advanced toward the other by an amount equal to one digit space. As a result, the output of each of the amplifiers 308, 309 consists of a series of pulses at 2-digit intervals with the pulses on the lines 313 and 315 symmetrically staggered with respect to those on lines 314 and 316.

As a result of the pulses on lines 313 and 314, the flip-flop circuits are successively unlocked at one digit intervals producing a voltage at their respective outputs.

The flip-flop circuits are of conventional design as shown in Fig. 11. In brief, they include two triodes 317, 318 with the grids and plates diagonally connected. Normally, the flip-flop circuit will remain in one of its two stable conditions, namely, with one of the triodes conducting heavily and with the remaining triode substantially non-conductive. Under such conditions, variations in the input are not mirrored in the output. In order to enable the circuit to be converted from one stable condition to another, means are provided for unlocking the tubes, i. e., for rendering both tubes momentarily non-conducting. This is accomplished by connecting the pulse lead 313 to a source of positive voltage pulses. When such voltage is subsequently removed, the tube which starts conducting will be determined by the then existing voltage at the input lead 304.

The voltage pulse obtained from disk 301 travels down the line of flip-flop tubes as alternate tubes are unlocked, advancing through one tube per digit interval. The output voltage of each flip-flop resulting from the initial voltage pulse exists over an interval equal to two digit spaces however, which is excessively long for switch controlling purposes. Accordingly, such voltages are employed to successively close the series of switches 282-300 allowing passage of the short pulses received from the amplifiers 308, 309 via leads 315 and 316. The switches 282-300 are similar to the switch shown in Fig. 5 and described earlier except that one of the two switch tubes together with its input and output lead is omitted. There will be a 180 degree phase reversal in going through the switch but this is compensated for by taking the inputs from lines 315 and 316 rather than 313 and 314.

As a result of the foregoing arrangement of switches and flip-flop circuits, a short voltage pulse appears at the output of each of the switches 282-300 at precisely one-digit intervals. The timing of the pulses relative to the beginning of a step of computation is indicated by the small numeral included within the switches 282-300. For example, the −4 pulse will occur four digit intervals in advance while the +4 pulse will occur four digit spaces after the beginning of the step.

Similarly to the device disclosed in my copending application mentioned above, two layers or series of flip-flop devices are used, a conditioning series 311 and an output series 312. The first series, including the devices 321-331, is fed on the input side by the control trunk 255 coming from the pickup head 253 of the control tape. They cannot, however, all respond simultaneously to the voltage impulses on the line 255 since they are unlocked only one at a time by the pulses from switches 282-300. Each of the flip-flop devices 321-331 may be considered to have a control space reserved for it on the tape 250, with the tape being so phased that such space passes the head 253 just as the corresponding flip-flop device is unlocked. Thus, by the end of one step of computation, each of the flip-flop devices in the first series or layer 311 has been energized by the control tape to assume the condition suitable for the next step.

The second or "output" series includes the flip-flop devices 332-341. These are triggered in subgroups to transmit a control signal to the various switches in the arithmetic unit at a desired instant. For example, the flip-flop devices 338-341 are simultaneously unlocked by a line 342 connected to the switch 286 which operates precisely at the beginning of a step of computation. Upon such unlocking, these flip-flop devices are put into a state corresponding to that of the flip-flop circuits 328-331 previously set by the control tape. The voltage apppearing at the output terminals q, r, s, t, u, connected thereto will be either a small positive volage on the order of 30 volts or a large positive voltage on the order of 90 volts. In the case of the flip-flop device 338 the output voltage on the terminals q, r will be complementary. The fact that the terminals q–u change potential at the beginning of a step, in other words at the zero point of time reference, is indicated by the 0 placed adjacent each of such terminals.

The general control scheme utilized for the output flip-flop devices 338-341 is satisfactory where the associated switches in the arithmetic unit are to be left in the predetermined condition of conduction or non-conduction throughout the entire step of computation. In performing translation, however, I have found it desirable to operate certain of the switches two or even three times during the course of a single step. Obviously, it would not be possible to have a single control signal derived from the tape 250 during one step simply stored for use at the beginning of the succeeding step. To resolve this difficulty and in accordance with the invention, means are provided for conditioning a first flip-flop device not only during the preceding step but one or more times during the current step and after each conditioning, triggering the output flip-flop device so that the control signal is fed to the arithmetic unit precisely when required.

By way of specific example, reference is made to the flip-flop devices 322-332 and more particularly to terminal j associated therewith. This terminal serves to control the switch 170 shown along the left-hand portion of Fig. 2. In carrying out the translation it is necessary for zeros to be inserted on the disk 160 through a switch 170 over predetermined intervals. The zeros must be turned on or off by the control tape at the −4 digit space, the zero digit space and the +4 digit space. Part of the reason for the three control times for this switch is the necessity of filling in 16 zeros when changing a 4-digit binary number to a 20-digit number. In order to do this, the zeros must be turned on at the +4 pulse and off at the zero pulse. As will be explained later in connection with translation back to binary codes for decimal digits, it is necessary to fill in the last four digit spaces with zeros. This means that the zeros must be turned on at the −4 pulse and off at the zero pulse. In order to obtain this type of control, the flip-flop device 322 (Fig. 3) in the first or storage layer must be conditioned just prior to the time that the control information could be passed on to the arithmetic unit. We may assume, for example, that the flip-flop device 322 is conditioned, say in the −7 digit space by a −7 pulse synchronized therewith. This is shown diagrammatically in Fig. 12 with the tape 250 assumed to be moving to the left. Then at the −4 pulse three digits thereafter the associated output flip-flop device 332 is unlocked so that the information which has been temporarily stored in the device 322 is passed to the arithmetic unit.

In order to apply a new and perhaps different control signal to the terminal j (for switch 170) at the beginning of a step, it is necessary to again condition the flip-flop device 322. While this may be done any time between the −4 pulse and the zero pulse, it is illustrated in Fig. 12a as being taken care of by the −3 pulse. Then precisely at the beginning of the step the flip-flop device 332 is unlocked and the information from the −3 digit space on the control tape allowed to pass to terminal j.

In order to operate the switch again at the +4 pulse as required for the process of translation, the storage flip-flop device is again conditioned by information contained on the control tape between the 0 and the +4 digits, for example, at the +2 digit space. Upon unlocking of flip-flop device 332 at the +4 pulse the control voltage is permitted to pass to terminal *j*. This step is illustrated in Fig. 12*b*. To summarize Figs. 12, 12*a* and 12*b*, control information is stored in the control tape at the −7, −3 and +2 digit spaces and released for operating switch 170 at the following times: four digit intervals ahead of the step, right at the beginning of the step, and four digit intervals thereafter. The present arrangement is highly flexible since control data need not be stored at any particular spot on the control tape 250.

In the case of the remaining terminals in the control unit, control voltages are produced for operation of an associated switch no oftener than twice during one computation step. Thus, flip-flop devices 327–337 apply a control signal to terminal *k* at the +4 digit space. Control voltage is applied to the associated terminal *l* at the tenth digit space since this terminal by-passes the output flip-flop device 337.

In the case of terminals *o* and *p*, control voltage is applied to the associated switches both at the zero digit space and at the +4 digit space. This is accomplished by triggering the output flip-flop devices 335, 336 from switches 286 and 299. It is understood, of course, that prior to the zero digit space and +4 digit space, the associated storage or conditioning flip-flop devices 325, 326 are conditioned by the control tape in the same manner as discussed in connection with Figs. 12, 12*a* and 12*b*.

In a completely analogous fashion, control signals are applied to terminals *m*, *n* at the −4 digit space and zero digit space by reason of the flip-flop devices 323–333 and 324–334 respectively. The terminal *i* is energized at the +4 digit space. Finally, the terminal *h* controlled by a flip-flop device 320 is energized at the zero digit space and the terminal *g* is energized by the flip-flop device 319 at the −4 digit space. Since the control unit is similar in mode of operation to that disclosed in my prior application, reference is made thereto for more detailed explanation. Cathode followers of the conventional kind are employed as necessary for isolation purposes in the pulse leads when it is necessary for a conditioning or output flip-flop device to be controlled from more than one pulse. These are in each instance designated *c*.

In order to insert digits in the low order as required in the summing circuit 190, means are provided for operating a pair of switches, one of which cuts off the normal input channel and the other of which completes a circuit from the zero generator during the first digit space. This is accomplished by a low order digit inserter disk 350 having a pickup head 351 and a pickup amplifier 352. To insure that the switch operation is synchronized with the digits supplied to the summing circuit, a synchronizing flip-flop device 353 is used having terminals *e*, *f* and an unlocking lead 354. This flip-flop device is unlocked at the beginning of the zero digit space by the pulse from switch 286 and again at the beginning of the +1 digit space by the pulse from switch 287. The disk 350 is provided with teeth 350*a* which are one digit space long and which have a leading edge at the beginning of the zero digit space. Consequently, the change in flux at these two points will produce a voltage output from the amplifier 352 which is first in one direction and then in the other. This causes the flip-flop device 353 to be converted to its alternate condition at the beginning of the zero digit space and to be restored to its original condition one digit space later which in turn causes the switches associated with the terminals *e*, *f* to pass only a single digit for insertion in the low order as required. It will be understood that the terminals *e*, *f* at all times carry voltages which are complementary, this being accomplished by connecting them to the plate terminals of the respective tubes in the flip-flop device.

As an incident to the one place shifting of a binary number in disk 171 which occurs during multiplication, it is necessary to fill in with a zero the digit space thus vacated. In the present instance, this is accomplished by a zero fill-in disk 360 having a pickup head 361 feeding into a pickup amplifier 362. The signal from the latter controls a flip-flop device 363 having terminals *c*, *d* and an unlocking lead 364. The similarity between this arrangement and that discussed immediately above will be apparent upon inspection of Fig. 3. In both, the disk carries square teeth one digit long. The difference lies in the placement of the teeth and the timing of the unlocking pulses to the flip-flop devices. In the case of the disk 360 the teeth have a leading edge at the beginning of the −1 digit space. Unlocking pulses are applied at the start of the −1 and zero digit spaces. Consequently, a *o* is filled in on disk 171 just prior to the recording of a shifted binary number.

To complete the discussion of Fig. 3, means are provided for supplying unlocking impulses to the carry delay chain in the summing circuit 190. This is accomplished by a toothed pulsing disk 370 having pickup heads 371, 372 with pickup amplifiers 373, 374 respectively feeding terminals *a*, *b*. The teeth 370*a* on the disk 370 are spaced at intervals of half a digit space. The heads 371, 372 are not exactly at right angles to one another but are offset by half a tooth or one-quarter digit space. As a result, the pulses applied to the terminals *a*, *b* are staggered and occur on each of the terminals at one-half digit intervals.

DATA FLOW DIAGRAM FOR THE DECIMAL-BINARY TRANSLATION

The present invention involves more than the presence and interconnection of certain electrical and mechanical components. In certain aspects it resides in the manner or method in which such components are utilized to effect data flow for the solution of a problem, here the translation of decimal digits expressed in a binary code into a true binary number.

In the practice of the invention a relationship corresponding to the following expression is employed:

$$\text{Binary number} = [(a \times 10) + b] \times 10 + c$$

where,
*a* is the digit of highest order,
*b* is the digit of next lower order, and
*c* is the digit of next next lower order.

The above equation may be extended in the general case to cover any desired number of decimal digits simply by multiplying the previously obtained quantity by 10 and adding the next lower digit. This process is continued until the lowest order digit has been added. Prior to using the expression the numbers involved are converted into binary form. Each of the decimal digits is expressed by its binary equivalent in the binary code group formed by the coding device (Fig. 1). The decimal 10 multiplier is converted to its binary equilvalent 1010. Assuming, for purposes of illustration, that *a*=7, *b*=3, and *c*=4, the above formula expressed in the binary systems becomes:

$$\text{Binary number} = \{[(0111) \times (1010)] + 0011\}(1010) + 0100$$

The complete translation from the decimal to the binary system is effected in a series of steps. In the first step each decimal digit is converted into a corresponding binary code group. This is accomplished by means of the coding device described in Fig. 1. In the second step, such code groups are passed from the tape on which they are recorded to the arithmetic unit in a series of code groups, for example, a series of ten. The reason for this has been discussed in a previous section. As a final step, the conversion from code group to binary number is effected in accordance with the above formula. In the case of the latter two steps, the necessary directions are issued to the data flow switches by means of control data previously recorded on the control tape.

While it would be possible to show in diagrammatic form a length of control tape with the order and spacing of control data thereon which are required to produce a given sequence of operations in the arithmetic unit, interpretation of data given in this form would be extremely laborious. Instead, a diagram has been prepared setting forth in detail an example of an actual transformation. This diagram, formed of Figs. 13, 13a and 13b, shows not only the active data flow paths in each step of the process, but also the binary digits read from and recorded on the various disks. Across the top of the diagram are listed the elements between which data flow takes place including the disks 109, 160, 171 as well as the tape 22. The zero generating disk 167 and the output disk 211 are not shown since they are not required to understand this portion of the translation process. The successive steps are listed along the left-hand edge of the diagram. In each step a binary number is read from the tape or one of the disks and either transferred elsewhere or suitably transformed. Possible transformations include shifting to the left relative to the binal point and the addition of one binary number to another. The time consumed in each of the steps is the same and is referred to for convenience as a "number interval." It is equal to the time required for the disks to rotate through one "number space," this in the present instance being one-quarter of a revolution.

In the present example, it will be assumed that the decimal number 43751 has been punched into the keyboard starting with the digit of highest order. It appears in the form of a binary code on the tape 22 as follows:

$$\underbrace{0001}_{1}\ \underbrace{0101}_{5}\ \underbrace{0111}_{7}\ \underbrace{0011}_{3}\ \underbrace{0100}_{4}$$

The digits will normally be run together on the tape. The conversion of the above code groups into the equivalent binary number will now be discussed step by step. Certain of the steps are preliminary, Steps 1 and 2 covering the transference of the numbers from the tape, and Steps 3 to 6 the conversion from a 4-diigt code to a 20-digit code.

Step 1

The motor 102 is started and the shaft 101 advanced to a point where the head 151 on the disk 109 is alined at the beginning of a quadrant. At this point the "B" clutch operates to start movement of the data tape 22 and the switch 108 is turned on so that successive code groups from the data tape are recorded on the periphery of the input disk 109. The first five code groups are sufficient to fill up quadrant 1. Although this completes Step 1, in another portion of the computer something else is occurring which will later become of interest. The switch 179 is closed during the −1 (minus one) digit interval so that a binary 0 is recorded or filled in the low order digit space of the multiplying disc 171. This function is repeated for each step so that a fill-in zero is automatically entered in the lowest order of each of the quadrants. In the steps which follow this path will not be repeated but the binary 0 which results will be listed and underlined throughout.

Step 2

The succeeding set of five code groups is recorded on disk 109 making a total of ten code groups. The "B" clutch is so designed as to rotate precisely one-half revolution and then come to a stop until such time as it may again be energized.

Step 3

This is an idle step while waiting for the numbers recorded on disk 109 in Step 1 to become available. In an actual problem, the tape could have been started prior to the completion of the last translation and the idle step eliminated.

Step 4

The first code group 0100 on disc 109 is transferred to disk 160 where it is recorded. Switch 170 is subsequently turned on so that the remainder of the quadrant is filled up with zeros. This effectively a conversion from a 4-digit binary code to a 20-digit binary code. Due to the four digit advancement of the recording head 151 on disk 109, the remaining 4-digit codes thereon are recorded in a different quadrant advanced four places to the right in such quadrant so that the second binary code group 0011 occupies a position at the beginning of a quadrant. Because of the three recording heads 161, 162, 163 on disk 160, the binary code group 0100 and the zeros to the left of it are recorded in not one but three places on the disk.

Step 5

The remaining code groups on disk 109 are advanced four digit spaces so that they will follow closely after those recorded in Step 4. The x's denote information which has been left on the disk as a result of a previous computation. It is of no importance since it will be erased and replaced by other data in the steps which follow.

Step 6

This is an idle step inserted at this time so that the multiplication of the first number by 1010 will be completed during the proper step to enable the product to be added to the next number obtained from disk 109. The multiplication by 1010 cannot be completed in three steps, the time at which the second code group is available. Consequently it must be made to take seven steps which is the second time that the next code group will be available. The idling can be conveniently done at this time since the number is available from disk 160 in any one of three steps.

Step 7

Having a 20-digit code for the first or high order decimal digit, we now wish to multiply it by decimal 10. This can be accomplished by the equivalent operation of multiplying the binary number corresponding to the decimal digit, here . . .0100, by the binary equivalent of decimal 10, namely 1010. This multiplication could, if desired, be performed rigorously as set forth in my co-pending application Serial No. 76,088 filed February 12, 1949. In the present instance, however, the multiplication may be performed in fewer steps by the following procedure: doubling the multiplicand twice, adding the resulting product to the multiplicand, and then doubling the sum. The doubling may be effected merely by moving the multiplicand, expressed in binary form, one binal place to the left. To double twice, the multiplicand is moved one place to the left twice in succession. In this step, the first multiplication is accomplished merely by passing the binary number . . .0100 from disk 160 to disk 171 through 175, 176. The relative shift of the recording head 172 results in a shift to the left of one binal place.

Step 8

In this step the second multiplication is accomplished by reading off the number recorded on disk 171 and re-recording it in another quadrant. This is done by closing switches 178, 176 to form a loop circuit.

Step 9

In this step, the binary number which has now been effectively multiplied by 4 has been fed into the summing circuit 190 along with the original number . . .0100. The original number is read from disk 160 having been recorded thereon in Step 4 and subsequently stored. This results in a sum . . .10100 which is recorded on disk 160 via switch 194.

Step 10

This is a second idle step inserted to complete the seven steps required before the product is transferred to disk 171 to be added to the second code group.

Step 11

Here the final multiplication by 2 (shift to the left) is accomplished. This is done by reading the number from disk 160 and recording it on disk 171. As above, the shift to the left takes place because of the fact that the head 172 is retarded one digit space. This completes the first portion of the transformation, the binary number now being ...101000. During this step the second code group is available on disk 109 and switch 155 is therefore closed causing the second code group 0011 to be read from the disk 109 and recorded on disk 160. The remaining places in the quadrant are filled with zeros obtained from disk 167 via switch 170. During this step, the second binary code group 0011 is recorded on two additional quadrants of disk 160 but this is not shown in the diagram since the additional recordations are, in any event, erased by what is recorded in Step 12. The remaining code groups on disk 109 are advanced one quadrant and shifted relative to that quadrant as in Step 4.

Step 12

The second binary code group ...0011 is next added to the result obtained in Step 11 (first code group after multiplication by decimal 10) and the sum recorded on disk 160 in three places. During Step 12, the remaining code groups on disk 109 are advanced to make them follow closely after those recorded on disk 109 in Step 11.

Steps 13 and 14

These are idle steps required for an additional binary code group to become available at the proper time on disk 109.

Step 15

It is necessary that I multiply the result of Step 12 by decimal 10. This is accomplished by the same shortcut as in Step 7. First, the result of Step 12 is transferred from disk 160 to disk 171 via switches 175 and 176 resulting in the first multiplication by 2.

Step 16

Multiplication by 2 is again effected by reading the information from disk 171, passing it through switches 178 and 176 and re-recording it thereon.

Step 17

The result of Step 16 is now added to the result of Step 12 to produce a sum ...11010111 which is recorded on disk 160.

Step 18

Multiplication by 2 is again required in order to complete the second multiplication by decimal 10. This is effected by transfer of the number from disk 160 to disk 171 via switches 175 and 176. Simultaneously, the third binary code group 0111 is transferred from disc 109 to disk 160 via switch 155. The next binary code group on disk 109 is also advanced into a position of readiness flowing through the loop circuit including switch 154.

Step 19

The third binary code group 0111 is added to the result of Step 18 to produce a sum which is passed through switch 194 and recorded on disc 160. The result at this point is the binary number ...110110101. It will be apparent to one skilled in the art that this corresponds to the decimal number 4, 3, 7 constituting the first three digits of the number entered on the keyboard. It will be unnecessary to carry this process through additional steps since the pattern is repeated using the fourth code group 0101 and the fifth code group 0001. With the above process carried to its logical conclusion, a binary number results as follows: 00001010101011100101. This is equivalent to the decimal number 4, 3, 7, 5, 1. The binary number may then be utilized in any desired computer, for example, the one disclosed in my copending application Serial No. 76,088.

BINARY TO DECIMAL TRANSLATION

For simplicity the present application is limited to translation per se and it will be understood that the binary number which is obtained by the steps outlined above will be used along with other translated numbers in the solution of a practical problem. In the present section it will be assumed that the problem has been completed and the answer obtained in binary form ready for the binary to demical or "up" translation. The number which results from the process to be described will not be in decimal form but will be in the form of binary code groups representative of the successive decimal digits, i. e. the same form in which the data is supplied to the arithmetic unit from tape 22. Numbers are recorded in the form of binary groups on the output tape 210 which is suitable for feeding into a printer.

As a first step in the "up" translation, the binary number is converted into a form in which it has a value less than decimal 10. This conversion would be made by dividing the number to be translated by 16 times some power of 10. This latter quantity would be determined by the person who prepared the control tape for the problem being performed, and would be entered into the computer from the data tape. The division of the answer by this quantity could be performed by a computer such as described in my Patent No. 2,701,095.

The power of 10 by which the number is divided must be great enough to produce a quotient less than decimal 10 with the largest answer encountered. Reference to the above-mentioned application will show that the quotient obtained always has the binal point at the left. The factor of 16 used in the divisor is applied so that the binal point may effectively be shifted four places to the right to produce a true binary number representative of the number being translated divided by the power of 10. As mentioned this power of 10 is such that the quantity represented is less than decimal 10 and the four digits to the left of the binal point will be a true binary code for the first decimal digit. The "whole part" of this number is recorded while the "fractional part" lying to the right of the binal point is used as a basis for subsequent operations. Next, the fractional part is multiplied by binary 1010 (decimal 10). The product obtained is again separated into a whole part and a fractional part lying to the left and right of the binal point respectively. The whole part is recorded as the second digit of the decimal answer. The remaining or fractional part is multiplied by binary 1010 to form a new product. This is repeated over and over again until the desired number of decimal digits are obtained.

The manner in which the above process is carried out in the present translation device will be made clear by taking up a practical example and tracing the flow of data around the circuit step by step. The data flow diagram used for this purpose is to be found in Figs. 14, 14a, 14b.

Step 1

Suppose the answer obtained from a previous computation is 00100.001011110101100 after being divided by 16 × a suitable power of 10. This corresponds to the decimal number 4.184. It will be noted that the binal point is so located that there are five places to the left whereas in the outline of the process given above it was stated that there were four binal places to the left of the binal point. The reason for this will be clear when it is considered that initial transfer is necessary from disk 160 to disk 171. Because of the one-digit displacement of the recording head on the latter, transferring the number from disk to disk involves a shift of the number to the right relative to the binal point. It will be seen, therefore, that after shifting there are four places to the left of the binal point and we are now ready to start the actual "up" translation.

Step 2

In this step, the first separation occurs between the whole and the fractional part of the number. For this step, switch 180 is on for the first 16 digits. It is then turned off and switches 170 and 197 are turned on for the last four digits. Thus, the 16 low order digits comprising the fractional portion of the number are read from disk 171 and recorded on disk 160. The last four digits from disk 171 are recorded on disk 211 as representing the first decimal digit of the final answer. Since we have recorded on disk 160 only 16 digits, it will be necessary to fill out the remainder of the quadrant with zeros. Such zeros are obtained from the zero generating disk 167 through switch 170. It will be noted that because of the three recording heads on the disk 160, the number is simultaneously recorded in three of the four quadrants.

Steps 3 and 4

These are two idling steps which are necessary in order to obtain proper timing of subsequent data supplied to disk 211. Because it is necessary to re-record the previously obtained code groups on disk 211 just prior to adding a new code group, the timing of the translation process must be correlated with disk 211.

Step 5

This is the first of a series of steps required to multiply the fractional remainder by decimal 10. As in the previous example, this is accomplished by doubling the number twice to form a product, adding the original number, and doubling again. The first doubling operation takes place by reason of a transfer from disk 160 to disk 171, such transfer resulting in the shift of the number to the left.

Step 6

The number is re-recorded on disk 171 by a loop circuit which includes switches 176 and 178. This results in an additional shift to the left equivalent to doubling.

Step 7

In this step addition of the original number and the number resulting from the previous step takes place. The original number, it will be recalled, has remained on disk 160, having been recorded there in Step 2. The sum is recorded on disk 160 in three quadrants. However, only two of the recordations are shown since one of them is erased as a result of the recording of a number on this disk in Step 9.

Step 8

Here the final doubling occurs. The number is transferred to disk 171 which results in the shifting of a number to the left. After shifting, the number which has now been effectively multiplied by decimal 10, is again ready to be split into the whole and fractional part.

Step 9

This step is very similar to Step 2 previously discussed. The fractional portion of the number is transferred by a switch 180 to disk 160 and the vacated digit spaces are filled in with the zeros from the zero generating disk.

Attention may next be given to the whole portion of the number which is transferred to disk 211 by a closure of the switch 197 during the last 4-digit intervals of the step. These four binary digits are the binary representation of a decimal digit which is the second digit of the decimal answer. In order to have subsequently obtained code groups follow each other closely on disk 211, provision is included for advancing the four digits previously recorded thereon four digit spaces relative to a quadrant. The latter is accomplished by reason of the displacement of the head 212 four digit spaces to the right on disk 211 and by setting up a loop circuit so that the four digits are re-recorded on this disk. As a result, the two code groups thus far obtained occupy adjacent positions on disc 211. The above procedure is repeated over and over again so that it will not be necessary to describe each of the succeeding steps in detail. The succeeding steps correspond to those already obtained as follows:

| Step | Similar to— |
|---|---|
| Step 10 | Step 3 |
| Step 11 | Step 4 |
| Step 12 | Step 5 |
| Step 13 | Step 6 |
| Step 14 | Step 7 |
| Step 15 | Step 8 |
| Step 16 | Step 9 |
| Step 17 | Steps 3 and 10 |
| Step 18 | Steps 4 and 11 |
| Step 19 | Steps 5 and 12 |
| Step 20 | Steps 6 and 13 |
| Step 21 | Steps 7 and 14 |
| Step 22 | Steps 8 and 15 |
| Step 23 | Steps 9 and 16 |

Steps 24 and 25

Idling steps required to bring the final answer on disk 211 to the pickup head 214.

Step 26

By now the information on disk 211 consists of four binary code groups representative of four decimal digits, the latter forming the answer. In this step, the information on disk 211 is transferred to the answer tape, such tape later being fed into a printer capable of responding to the code groups. In a practical computer, the answer would not be recorded on a control tape at this point but rather would be held on disk 211 until ten to fourteen code groups were obtained. The code groups would then be advanced on the disk 211 by means of the loop previously described the proper number of times to bring the first code group to the start of a quadrant or number space so that transfer to the tape could be made. Such transfer would require merely closure of switch 217 and simultaneous energization of the "B" clutch 220.

Although magnetic tape has been used in the present device and is preferred it will be understood that the invention is by no means limited thereto but would include the use of magnetic wire or the like. Furthermore the term magnetic "disk" used in the claims includes any cyclically operating member carrying an endless loop or track of magnetic material.

I claim as my invention:

1. In a decimal-binary translating device, means for converting from decimal digits to groups of electrical pulses representative of such digits comprising, in combination, a collector including a series of electrical contacts and a collector arm for successively engaging said contacts, a source of normal voltage of one polarity, means including series resistors for connecting the voltage source to all of said contacts respectively, a decimal keyboard for successively entering decimal digits, each key thereof having a set of switches, said switches being so arranged as to apply voltage of opposite polarity to certain ones of said contacts so that voltage impulses are applied to said collector arm by each of said contacts and in predetermined sequence representative of a decimal digit when the collector arm is rotated.

2. In a translator for use with a computer in which the two binary digits are represented by plus-minus and minus-plus voltage couples respectively, a decimal coding device comprising, in combination, a collector including a series of electrical contacts arranged in pairs and a collector arm for successively engaging said contacts, a keyboard having keys corresponding to the various decimal digits, and means including switches operated by each of said keys for causing the voltages on the paired contacts to be minus-plus or plus-minus in such order that the sequence of voltage couples generated by the collector arm upon successive engagement of said contacts is representative of the binary number corresponding to a selected decimal digit.

3. In a translator for use with a computer in which the two binary digits are represented by plus-minus and minus-plus voltage couples respectively, a decimal coding device comprising, in combination, a collector including a series of electrical contacts arranged in pairs and a collector arm for successively engaging said contacts, a keyboard having keys corresponding to the various decimal digits, means including switches operated by each of said keys for causing the voltages on the paired contacts to be minus-plus or plus-minus in such order so that the sequence of voltage couples generated by the collector arm upon successive engagement of said contacts is representative of the binary number corresponding to a selected decimal digit, and means for recording said sequence of voltage couples in the form of correspondingly poled magnetic couples in a magnetic storage medium.

4. In a translator for use with a computer in which the two binary digits are represented by plus-minus and mius-plus voltage couples respectively, a coding device comprising, in combination, a source of positive voltage and a source of negative voltage, a series of electrical contacts, a keyboard having keys corresponding to the various decimal digits, means including switches operated by each of said keys for applying said voltages to said contacts in a predetermined distribution, the voltages on successive contacts being minus-plus or plus-minus in such order as to represent a binary number corresponding to the selected decimal digit, and means including an output terminal for successively engaging said contacts in such order that voltages representing the binary number occur in time sequence from low order to high order.

5. In a translator means for converting between parallel representation of binary numbers to sequential representation in which the two binary digits are represented by plus-minus and minus-plus voltage couples respectively, a series of electrical contacts, a source of positive voltage and a source of negative voltage, means for applying said voltages to said contacts in a parallel distribution with the voltages on successive contacts being minus-plus or plus-minus in such order as to represent the successive digits of a binary number corresponding to a selected decimal digit, and means including an output terminal for successively engaging said contacts in such order that voltages representing the digits of the binary number occur serially in time sequence from low order to high order.

6. In a decimal to binary translator for a computer in which the two binary digits are represented by plus-minus and minus-plus voltage couples respectively, a device for converting decimal digits into the equivalent binary number comprising, in combination, a source of voltage of one polarity, a source of voltage of the opposite polarity, a series of contacts having resistors associated therewith for normally connecting them to a source of voltage of one polarity, a keyboard having keys thereon for entering decimal digits in sequence, each of said keys having switches associated therewith for connecting said source of voltage of opposite polarity to predetermined ones of said contacts, means including a motor driven collector arm for successively engaging said contacts to form a series of voltage couples representative of a series of binary digits, and means for maintaining said switches closed and for releasing them automatically after all of the contacts have been engaged.

7. In a decimal to binary translator for a computer of the type in which the two binary digits are represented by plu-minus and minus-plus voltage couples respectively, means including a series of contacts and a collector arm for successively engaging the same, means including a keyboard having keys and switches operated thereby for setting up voltages in such order on said contacts that the collector arm generates voltage couples representative of the corresponding binary number, and means including a magnetic storage medium and a recording head cooperating therewith for recording said voltage couples in the form of correspondingly poled spots of magnetism, and a motor for synchronous driving of said collector arm and said storage medium.

8. In a decimal-binary translator for a computer, the combination comprising a collector including a series of electrical contacts and a collector arm for sequentially engaging the same, means including a keyboard having keys and switches operated thereby for setting up on said contacts voltages representative of a code group, a magnetic storage member having a recording head energized by said collector arm, a driveshaft for driving said collector arm, and means including a drive mechanism coupled to said driveshaft for driving said magnetic storage member in unison with the movement of the collector arm as it engages said contacts and only during the time interval that the contacts are being engaged.

9. In a computer, a translator for converting decimal digits into code groups representative thereof comprising, in combination, a source of positive voltage and a source of negative voltage, a collector including a series of electrical contacts and a collector arm for sequentially engaging the same, means including a keyboard having decimal digit keys and switches operated thereby for applying said voltages to said contacts in a predetermined combination, recording means including a magnetic medium and a recording head energized by said collector arm, a motor for driving said arm, a stepping mechanism driven by said motor for advancing said magnetic medium in synchronism with the movement of said collector arm across said contacts and backspacing means enabling retrograde movement of said stepping mechanism for permitting a correction to be entered on said magnetic medium.

10. In a computer, a translator for converting decimal digits into code groups representative thereof comprising, in combination, a source of positive voltage, a source of negative voltage, and a neutral return, a collector including a series of electrical contacts and a collector arm, means including a keyboard having decimal digit keys and switches operated thereby for applying said voltages to said contacts in predetermined combinations, a magnetic storage medium having a recording head, the latter being energized by said collector arm and connected to said neutral return, a motor for driving said arm, a stepping mechanism driven by said motor for advancing said tape in synchronism with the movement of said collector arm across said contacts, and backspacing means enabling retrograde movement of said stepping mechanism for permitting corrective data to be recorded on said medium superimposed on data previously recorded.

11. In a computer, means for converting decimal digits into a code consisting of the corresponding binary number comprising, in combination, a collector having a series of contacts and a rotary collector arm, means including a keyboard having keys and switches operated thereby for setting up voltages on said contacts representative of the binary number, a motor for rotating said collector arm, a magnetic storage medium and a recording head co-operating therewith for recording the voltages on said contacts as a series of spots of magnetism, and a ratchet and pawl for advancing the medium one step for each rotation of the collector arm, said collector having a dead sector which is free of contacts, said collector arm being so phased that movement across the contacts takes place in unison with the advancement of the medium with return movement of the pawl occurring during the movement of the collector arm through the dead sector.

12. In a decimal-binary translator for a computer in which the two binary digits are represented by plus-minus and minus-plus voltage couples and recorded in the form of correspondingly pole magnetic spots, a magnetic storage mechanism comprising, in combination, a motor, a magnetic storage medium having a driving element, a drive including a ratchet and pawl interposed between said motor and said driving element for advancing the storage medium step by step, a recording head for cooperating with said medium, means for supplying said recording head with voltage impulses during the time that the medium is being transported forwardly, a torque motor connected to said driving element tending to drive the same in the reverse direction, and means including a back space key for disengaging said pawl and for enabling said driving element to be rotated backwardly by said torque motor in an amount equal to one unit of movement of said ratchet whereby corrective data may be recorded in the place of erroneous data on said storage medium.

13. In a decimal-binary translator for a computer in which the binary digits are represented by plus-minus and minus-plus voltage couples respectively, a coding device comprising a collector including a collector element and a plurality of electrical contacts, means including a transportable storage medium for recording the voltages on said collector element, a keyboard having keys on which decimal data may be entered, each of said keys having a plurality of switches for setting up voltages on said contacts in predetermined combination, driving means for said collector arm including a motor and a single revolution clutch actuated by depression of one of said keys, means driven by said single revolution clutch for advancing said storage medium one unit in unison with the movement of said collector arm, and means for retaining a selected one of said keys in its depressed condition thereby to maintain the voltages on said contacts during the period that the storage medium is being transported.

14. In a decimal to binary translating device the combination comprising, a collector including a series of electrical contacts and a driven collector member for successively engaging said contacts, sources of positive and negative voltage, a decimal keyboard for successively entering the decimal digits of a decimal number, each key of said keyboard having a set of switches arranged to connect said voltage sources to said contacts in a predetermined sequence with the switches so connected that the voltages successively applied to the collector arm by said contacts are representative of the binary number corresponding to the decimal digit entered on said keyboard, means for storing a representation of the voltages on said collector arm, and means for successively multiplying the binary numbers on said storage means by decimal 10, starting with the binary number corresponding to the decimal digit of highest order with the partial product being added between the steps of multiplication so that a binary number is produced which is the equivalent of the decimal number entered on the keyboard.

15. In a decimal to binary translating device the combination comprising, a collector including a series of electrical contacts and a relatively driven collector member for successively engaging said contacts, a decimal keyboard for the successive entry of decimal digits thereon and including switches responsive to the keys of said keyboard for setting up a combination of voltages on said contacts which represents the binary number equivalent to the decimal digit key which has been actuated, means engaged by the collector member for storing a group of binary numbers received therefrom, means for reading off the binary numbers one by one from the storage means from high order to low, and means for successively multiplying the stored binary numbers by decimal 10 starting with the binary number corresponding to the decimal digit of highest order, with the partial product thus obtained being added to the binary number corresponding to the decimal digit of next lowest order prior to each step of multiplication so that a binary number is produced which is the equivalent of the decimal number entered on the keyboard.

16. In a decimal to binary translation device, the combination comprising a decimal keyboard for the sequential entering of the digits comprising a decimal number starting with the digit of highest order, means for converting each of said decimal digits into an equivalent binary number, means for recording the binary numbers seriatim on a magnetic tape in the form of spots of magnetism thereon, means including a constantly running disk for temporary storage of a small group of such binary numbers, transfer means including switches for transferring said group of binary numbers from the tape to the disk, and means for successively multiplying the binary numbers on the disk by decimal 10 starting with the binary number corresponding to the decimal digit of highest order, with the partial product obtained thereby being added to the binary number corresponding to the decimal digit of next lowest order prior to each step of multiplication so that a binary number is produced which is the equivalent of the decimal number entered on the keyboard.

17. In a translator for use with a computer in which the two binary digits are represented by plus-minus and minus-plus voltage couples respectively, a decimal coding device comprising, in combination, a collector device including a series of electrical contacts arranged in pairs and a collector for successively engaging said contacts, a keyboard having keys corresponding to the various decimal digits, and means including switches operated by each of said keys for causing the voltages on the paired contacts to be minus-plus or plus-minus in such order that the sequence of voltage couples applied to the collector upon successive engagement of said contacts is representative of the binary number corresponding to a selected decimal digit.

18. In a translator means for converting between parallel representation of binary numbers to sequential representation in which the two binary digits are represented by plus-minus and minus-plus voltage couples respectively, a series of 8 electrical contacts, a source of positive voltage and a source of negative voltage, means for applying said voltages to said contacts in a parallel distribution with the voltages on successive contacts being minus-plus or plus-minus in such order as to represent the successive digits of a binary number corresponding to a selected decimal digit, means including an output terminal for successively engaging said contacts in such order that voltages representing the digits of the binary number occur serially in time sequence from low order to high order, and means including a recording medium for recording the voltage couples on equal incremental spaces on such recording medium.

19. In a decimal to binary translator for a computer of the type in which the two binary digits are represented by plus-minus and minus-plug voltage couples respectively, means providing a series of electrical contacts, collector means for establishing contact with said contacts successively, means including a keyboard having keys and switches operated thereby for setting up voltages in such order on said contacts that the collector means has applied to it voltage couples representative of the corresponding binary number, means including a magnetic storage device having a movable element for recording said voltage couples in the form of correspondingly poled spots of magnetism, and means for driving said collector means and the movable element of said storage device in unison with one another.

20. In a decimal to binary translator for a computer of the type in which the two binary digits are represented by plus-minus and minus-plus voltage couples respectively, means providing a series of electrical contacts, collector means for establishing contact with said contacts successively, means including a keyboard having keys and switches operated thereby for setting up voltages in such order on said contacts that the collector means has applied to it voltage couples representative of a code group comprising the corresponding binary number, means including a magnetic storage device having a movable element for recording the voltage couples representing a code group in the form of correspondingly poled spots of magnetism, means for driving said collector means and the movable element of said storage device in unison with one another, and manually operated means for causing retrograde movement of the movable element in said storage device through the space occupied by a code group thereon for permitting corrective data to be entered on said storage device in the place of an erroneous entry.

21. In a decimal-binary translator in which the two binary digits are represented by plus-minus and minus-plus voltage couples respectively, a device for performing a preliminary conversion of a series of decimal digits into respective code groups comprising, in combination, a collector device including a series of contacts and a collector, sources of positive and negative voltage, means including resistors for applying a voltage source of one polarity to all of said contacts, a keyboard including keys corresponding to the respective decimal digits, each of said keys having associated therewith a series of electrical switches for making a low resistance connection between certain ones of said contacts and the voltage source having opposite polarity when the key is operated, said switches being so connected to said contacts that the voltage couples successively applied to the collector upon successive engagement of said contacts are representative of the binary number corresponding to the decimal digit entered on said keyboard.

22. In an electronic computer employing the binary system of numbers, the combination comprising means including a magnetic tape having a recording head and a pickup head, means including a manual keyboard and coding switches associated with said tap recording head for registering a given decimal digit entered on said keyboard as a code group on said magnetic tape, said code group being in the form of spots of magnetism representing the binary number which corresponds to the given decimal digit and with the binary digits of such binary number arranged in sequence along the tape from low order to successively higher order, an arithmetic unit including a magnetic input disk provided with a recording head for recording spots of magnetism thereon and provided with a pickup head for converting the spots of magnetism into a series of corresponding voltage impulses, the pickup head on said tape being electrically coupled to the recording head on said input disk, continuously operating means for driving said disk and said tape in unison, a positive-type clutch interposed between said tape and said driving means, and means for engaging said clutch periodically for periodic transfer of an integral number of code groups to said input disk.

23. In an electronic computer employing the binary system of numbers, the combination comprising means including a magnetic tape having a recording head and a pickup head, means including a manual keyboard and coding switches associated with said tape recording head for converting decimal digits entered on said keyboard into a series of respective code groups on said magnetic tape, each of the code groups being in the form of spots of magnetism representing the binary number which corresponds to a given decimal digit and with the binary digits of such binary number arranged in sequence along the tape from low order to successively higher order, a set of magnetic disks including an input disk each provided with recording heads for recording spots of magnetism thereon representative of binary digits and each provided with pickup heads for converting the spots of magnetism into a series of corresponding voltage impulses, means including interconnecting circuits for transferring voltage impulses between said heads to effect transformations required in the solution of the problem, the pickup head associated with said tape being electrically coupled to the recording head associated with said input disk, means for driving said disks and said tape in unison, a positive-type clutch interposed between said tape and said driving means, means for causing said interconnecting circuits to transfer code groups from said input disk in the form of electrical impulses, and means for periodically engaging said clutch for the driving of said tape to supply an integral number of additional code groups to said input disk.

24. In an electronic computer employing the binary system of numbers and in which the two binary digits are represented by respective voltage impulses, the combination comprising means including a magnetic tape having a recording head and a pickup head, means associated with said recording head for registering a given decimal digit on said magnetic tape in the form of a code group of magnetic impulses, the code group representing the binary number which corresponds to the given decimal digit and with the binary digits of such binary number arranged in sequence along the tape, a set of magnetic disks including an input disk each provided with recording heads for recording magnetic impulses thereon representative of binary digits and each provided with pickup heads for converting the magnetic impulses into a series of corresponding voltage impulses, means including interconnecting circuits for transferring voltage impulses between said heads to effect transformations required in the solution of a problem, the pickup head associated with said tape being coupled to the recording head associated with said input disk, means for driving said disks and said tape in unison, a positive-type clutch interposed between said tape and said driving means, and means for engaging said clutch periodically for the periodic driving of said tape.

25. In a decimal to binary translation device, the combination comprising a decimal keyboard for the sequential entering of the digits comprising a decimal number starting with the digit of highest order, means for converting each of said decimal digits into an equivalent binary number, means for recording the binary numbers seriatim on a magnetic tape in the form of spots of magnetism thereon, a cyclically operating storage means for temporary storage of a small group of such binary numbers, transfer means including switches for transferring said group of binary numbers from the tape to the cyclical storage means, and means for successively multiplying the binary numbers in the cyclical storage means by decimal 10 starting with the binary number corresponding to the decimal digit of highest order, with the partial product obtained thereby being added to the binary number corresponding to the decimal digit of next lowest order prior to each step of multiplication so that a binary number is produced which is the equivalent of the decimal number entered on the keyboard.

26. In a digital computer in which the two binary digits are represented by voltage impulses recorded magnetically as correspondingly poled spots of magnetism, the combination comprising means including a first magnetic disk having recording and reading heads for temporary storage of numbers in the form of correspondingly poled spots of magnetism, means including a second magnetic disk having a plurality of recording heads angularly spaced from one another and having a reading head, the recording heads on the second disk all being connected electrically in parallel and coupled to the reading head on said first magnetic disk for the recording of a number from the first magnetic disk simultaneously in a plurality of locations on said second disk, a third magnetic disk having a recording head coupled to the reading head on said second disk and having a reading head, all of said disks being mechanically coupled together and divided into a plurality of number spaces of equal length, a head associated with said third disk being offset so that a number recorded on the third disk from a number space on the second disk is shifted in space and time phase to effectively multiply the same, and a summing circuit coupled to the reading heads of the second and third disks for simultaneously adding together (a) a shifted number from the third disk and (b) the original number from a location on the second disk different from that from which the number was originally read, and means for recording the output of the summing circuit.

References Cited in the file of this patent

UNITED STATES PATENTS

| | | |
|---|---|---|
| 1,163,346 | Johnson | Dec. 7, 1915 |
| 2,131,322 | Higgitt | Sept. 27, 1938 |
| 2,200,807 | Potts | May 14, 1940 |
| 2,255,201 | Wheelock | Sept. 9, 1941 |
| 2,298,608 | Bates | Oct. 13, 1942 |
| 2,318,591 | Couffignal | May 11, 1943 |
| 2,375,383 | Potts | May 8, 1945 |
| 2,397,604 | Hartley | Apr. 2, 1946 |
| 2,407,320 | Miller | Sept. 10, 1946 |
| 2,411,540 | Haigh | Nov. 26, 1946 |
| 2,429,227 | Herbst | Oct. 21, 1947 |
| 2,429,228 | Herbst | Oct. 21, 1947 |
| 2,540,654 | Cohen | Feb. 6, 1951 |
| 2,564,403 | May | Aug. 14, 1951 |
| 2,587,532 | Schmidt | Feb. 26, 1952 |
| 2,611,813 | Sharpless | Sept. 23, 1952 |
| 2,617,704 | Mallina | Nov. 11, 1952 |

OTHER REFERENCES

Progress Report on EDVAC, declassified Feb. 13, 1947, pages 4–24 to 4–30.

Investigations for Design of Digital Calculating Machinery, Prog. Report #2, Harvard University Computation Lab., distributed November 1948, pages II–5 to II–9.

"Storage of Numbers on Magnetic Tape," by Coombs, Proc. of the National Electronics Conf., vol. III, 1947, pages 201 to 209, published Mar. 17, 1948, copyright Mar. 17, 1948.

Theory and Techniques for Design of Electronic Digital Computers, University of Pa., June 30, 1948.

Lecture #25, Conversion Between Binary and Decimal Numbers, by Mauchly, pages 25–1 to 25–8.